United States Patent [19]

Choudhury et al.

[11] Patent Number: 5,719,854
[45] Date of Patent: Feb. 17, 1998

[54] EFFICIENTLY PROVIDING MULTIPLE GRADES OF SERVICE WITH PROTECTION AGAINST OVERLOADS IN SHARED RESOURCES

[75] Inventors: Gagan Lal Choudhury, Aberdeen; Kin K. Leung, Edison; Ward Whitt, Basking Ridge, all of N.J.

[73] Assignee: Lucent Technologies Inc., Murray Hill, N.J.

[21] Appl. No.: 628,305

[22] Filed: Apr. 5, 1996

Related U.S. Application Data

[63] Continuation of Ser. No. 344,268, Nov. 23, 1994, abandoned.

[51] Int. Cl.$^6$ ............................................. H04J 3/12
[52] U.S. Cl. ............................................. 370/231; 370/235
[58] Field of Search .................... 370/17, 60, 60.1, 370/79, 94.1, 94.2, 110.1, 229, 230, 231, 235

[56] References Cited

U.S. PATENT DOCUMENTS

| | | | |
|---|---|---|---|
| 4,984,264 | 1/1991 | Katsube | 370/17 X |
| 5,040,171 | 8/1991 | Osaki | 370/17 |
| 5,058,105 | 10/1991 | Mansour et al. | 370/16 |
| 5,101,451 | 3/1992 | Ash et al. | 379/221 |
| 5,166,894 | 11/1992 | Saito | 370/94.1 X |
| 5,274,644 | 12/1993 | Berger et al. | 370/95.1 |
| 5,291,481 | 3/1994 | Doshi et al. | 370/60 |

OTHER PUBLICATIONS

J. W. Roberts, "Performance Evaluation and Design of Multiservice Networks", *COST 224 Final Report, Commission of the European Communities*, Luxembourg, 1992.

J. S. Kaufman, "Blocking in a Shared Resource Environment". *IEEE Transactions on Communications*, vol. COM-29, No. 10, Oct. 1981, pp. 1474–1481.

F. Kamoun et al., "Analysis of Shared Finite Storage in a Computer Network Node Environment Under General Traffic Conditions", *IEEE Transactions on Communications*, vol. COM-28, No. 7, Jul. 1980, pp. 992–1003.

A. E. Eckberg, Jr., "Generalized Peakedness of Teletraffic Processes", *Proceedings of the Tenth International Congress*, Montreal, Canada, Paper No. 4.4b.3.

L.E.N. Delbrouck, "A Unified Approximate Evaluation of Congestion Functions for Smooth and Peaky Traffics", *IEEE Transactions on Communications*, vol. COM-29, No. 2, Feb. 1981, pp. 85–91.

R. I. Wilkinson, "Theories for Toll Traffic Engineering in the U.S.A.", *The Bell System Technical Journal*, vol. 35, No. 2, Mar. 1956, pp. 421–514.

(List continued on next page.)

*Primary Examiner*—Douglas W. Olms
*Assistant Examiner*—Russell W. Blum

[57] ABSTRACT

Techniques for (a) controlling admission of customers to a shared resource, (b) adjusting the capacity of a resource in light of new customer demand, and (c) diverting usage from a failed resource to alternative resources, each use a "blocking probability computer" (BPC) to solve a resource-sharing model that has a product-form steady-state distribution. The techniques allow each customer to obtain an appropriate grade of service and protection against overloads from other customers. Each customer is a source of a series of requests, and is assigned "upper-limit" (UL) and "guaranteed-minimum" (GM) "bounds" on its requests. The upper limit bound puts an upper limit on the number of requests from that customer that can be in service at any time. The guaranteed-minimum bound guarantees that there will always be available resource units in the resources to serve a specified number of requests from that customer. The desired blocking probabilities are directly expressed in terms of normalization constants appearing in the product-form steady-state distribution. The BPC computes the normalization constants by first constructing the generating function (or z-transform) of the normalizing constant and then numerically inverting the generating function.

12 Claims, 9 Drawing Sheets

OTHER PUBLICATIONS

J. Abate et al., "The Fourier–Series Method for Inverting Transforms or Probability Distributions", *Queueing Systems*, vol. 10, pp. 5–88.

G. L. Choudhury, et al. "Multidimensional Transform Inversion with Applications to the Transient M/G/1 Queue", *The Annals of Applied Probability*, vol. 4, No. 3, 1994, pp. 719–740.

S–P. Chung et al. "Reduced Load Approximations for Multirate Loss Networks", *IEEE Transactions on Communications*, vol. 41, No. 8, Aug. 1993, pp. 1222–1231.

F. P. Kelly, "Loss Networks", *The Annals of Applied Probability*, vol. 1, No. 3, 1991, pp. 319–378.

W. Whitt, "Blocking When Service is Required from Several Facilities Simultaneously", *AT&T Technical Journal*, vol. 64, No. 8, Oct. 1985, pp. 1807–1856.

W. Whitt, "Heavy–Traffic Approximations for Service Systems with Blocking", *AT&T Bell Laboratories Technical Journal*, vol. 63, No. 5, May–Jun. 1984, pp. 689–708.

D. Bertsekas et al., "Data Networks", *Prentice Hall*, 1992, pp. 404–410 and Table of Contents.

Z. Dziong et al. "Congestion Probabilities in a Circuit–Switched Integrated Services", *Performance Evaluations*, vol. 7, pp. 267–284, 1987, pp. 267–284.

L. E. N. Delbrouck, "On the Steady–State Distribution in a Service Facility Carrying Mixtures of Traffic with Different Peakedness Factors and Capacity Requirements", *IEEE Transactions on Communications*, vol. COM–31, No. 11, Nov. 1983, pp. 1209–1211.

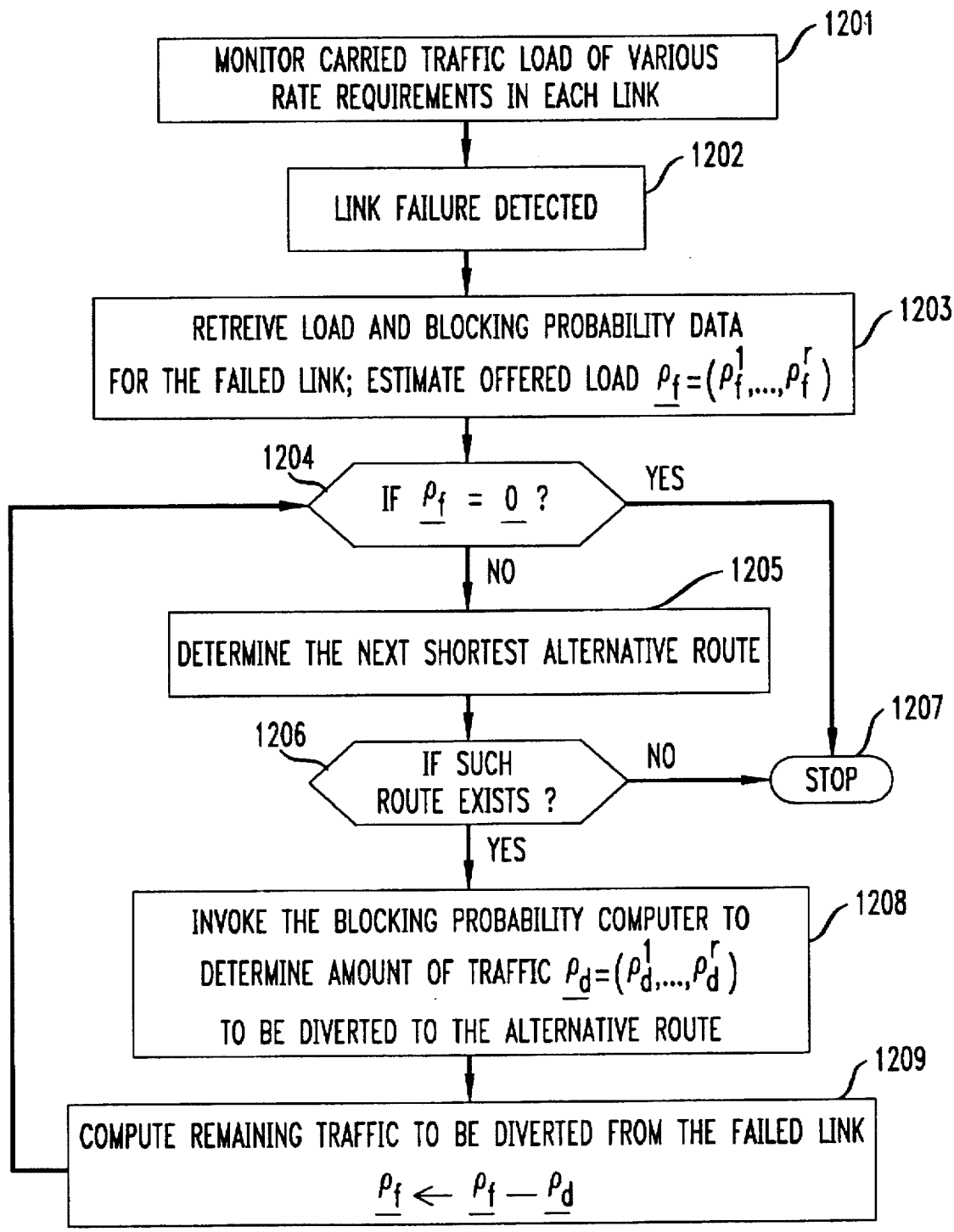

EFFICIENTLY PROVIDING MULTIPLE GRADES OF SERVICE WITH PROTECTION AGAINST OVERLOADS IN SHARED RESOURCES

This application is a continuation of application Ser. No. 08/344,268, filed on Nov. 29, 1994 abandoned.

FIELD OF THE INVENTION

The invention relates to efficiently providing multiple grades of service, including protection against overloads, for multiple customers sharing limited resources, and, more particularly, to (i) controlling when a prospective new customer is admitted or allowed to use the resources with a desired grade of service, (ii) adjusting the capacities of the resources in the face of changing customer demand, and (iii) responding to resource failure.

BACKGROUND OF THE INVENTION

Resource-sharing problems generally involve one or more "resources", each containing multiple resource "units" which provide service to multiple "customers". Each customer is a source of a series or stream of "requests". Each customer request requires a number of units from each resource, which may be zero, one, or greater than one, and may be different for different customers, but which is the same for different requests of the same customer. If all requirements can be met upon arrival of a new request, then the new request is admitted, and all required resource units are reserved or held throughout the request holding time. Otherwise, the request is not admitted, and is said to be "blocked".

Resource sharing as described above takes place in many physical settings, for example, in communication networks and in computer systems. In a circuit-switched telecommunications network, the resources may be "links" and the resource units may be "circuits" on these links, while the customers may be associated with different "services" (e.g., voice, data, video and facsimile), and the requests may be "calls". Calls often require circuits simultaneously on several different links, with the specific links depending on the origin and destination of the call. For some services, calls require multiple circuits on each link.

A circuit-switched telecommunication network example is depicted in FIG. 1. In this figure, there are 5 nodes, 101–105, and 5 links, 111–115, with link "i" having $K_i$ circuits. (In this case, the nodes play no role.) This network serves multiple customers, with the customer being characterized partly by the set of links or "route" that the customer requires. For example, in the setting of FIG. 1 there might be six routes requiring the following subsets of links:

| Route | Links |
|-------|-------|
| 1 | 111 |
| 2 | 112 |
| 3 | 111,112 |
| 4 | 113,115 |
| 5 | 114,115 |
| 6 | 111,113,115 |

There might be many more customers, because there can be different customers on the same route. For example, some customers may require only one circuit on each link, whereas other customers may require multiple circuits on each link. To be more concrete, certain kinds of data service calls require 6 circuits on each link, while standard voice calls require only one circuit on each link. In this setting a customer might represent a class of calls, either voice or data, on a particular route. Thus, there would be a total of 12 customers, with one data customer and one voice customer on each of the six routes. The six customers on routes 1, 3 and 6 thus all use link 111 and share the $K_1$ available circuits there. When a data call is attempted on route 6, it requires 6 circuits on each of the links 111, 113 and 115. If, at the time of the attempt, sufficient free circuits are not available on any of these links, then the call is blocked. In contrast, a voice call on route 1 requires only one circuit on link 111. Unless special measures are taken, as provided by this invention, the data calls on route 6 will clearly experience much higher blocking than the voice calls on route 1. Moreover, in this setting the network provider wants to be able to provide appropriate grades of service to the different customers, including protection against overloads from other customers.

In a broadband integrated-services digital network (B-ISDN) supported by the asynchronous transfer mode (ATM) technology, the resources may be "switches" and other network facilities, the resource capacity (units) may be the "bandwidth" available at these network facilities, while the customers may be prospective "users" of the network who wish to establish a connection and the customer requests may be ATM cells, bursts of ATM cells or required "effective bandwidths" associated with bursts of ATM cells within an established connection. FIG. 1 could also apply to this B-ISDN example. If the critical resources are the switches, then the nodes 101–105 are the resources. More generally, both nodes 101–105 and links 111–115 might be important resources. Since B-ISDN networks are intended for a broad range of services, it is important to allow customers to have very different traffic characteristics and very different requirements. In particular, requests from different customers may use different numbers of resource units. In this context, admission control is a well known but challenging problem of current interest (see J. W. Roberts, "Performance Evaluation and Design of Multiservice Networks," COST 224 Final Report, Commission of the European Communities, Luxembourg, 1992).

The resource provider is faced with two fundamental problems: The first is the obvious fact that resource units are expensive to provide, so that it is important to have no more capacity than necessary. The second is the probabilistic nature of the problem. The submission of customer requests and the holding times of these requests are uncertain events that fluctuate over time. Therefore, the actual requirements of the customers cannot be known in advance. However, the pattern of customer requests and request holding times can be predicted in a probabilistic sense. Indeed, it is known that probabilistic or stochastic models may be used to characterize the customer requirements. In this uncertain environment with limited resources, some blocking of customer requests becomes inevitable unless the resource capacity greatly exceeds demand. It is thus customary to characterize the quality of service received in terms of a customer's "request blocking probability", i.e., the long-run proportion of requests that are blocked in a particular operating regime. Each customer wishes to have its request blocking probability be suitably low. Request blocking probabilities that are too high fail to satisfy customer requirements. On the other hand, request blocking probabilities that are too low mean that more capacity has been provided than is needed.

In this probabilistic setting, the resource provider needs to: (i) determine the admissibility of a given set of customers for given resource capacities, (ii) determine appropriate resource capacities for a given set of customers, and (iii) determine how to respond to temporary unavailability of one or more resources because of resource failure. These problems can be considered when each customer's request traffic is characterized (probabilistically) and each customer's blocking probability requirements are given. When all customers have full access to the resources, i.e., when a "complete-sharing policy" is used, there are known methods to calculate the blocking probabilities for each class in a model of the system under consideration. The resource provider can then check to see if the prevailing customer-request blocking probabilities meet the requirements. The resource-provider can use these calculations to determine whether or not to admit new customers, to determine appropriate capacities, and to determine how to respond to resource failures. However, existing methods for computing these blocking probabilities encounter severe difficulties as the model gets large. Thus, there has remained a need to be able to solve much larger models of the standard form than could be solved up to now.

In addition to having difficulty when the model becomes large, existing methods have difficulty computing blocking probabilities when the request arrival processes have exceptionally high or low variability. The standard representation of an arrival process in the resource-sharing model is a "Poisson" process. However, in many applications the arrival process of customer requests is significantly more or less variable than a Poisson process, and these alternative forms of arrival process variability significantly affect the customer request blocking probabilities. For example, highly variable arrival processes routinely arise in overflow traffic, as occurs when there is alternative routing in a telecommunication network. Thus, there is a need for an effective way to characterize non-Poisson arrival process variability and accurately determine the customer request blocking probabilities.

Moreover, the resource provider actually is strongly motivated "not" to use the complete-sharing policy, for which known methods often apply. An important feature of many emerging resources is the presence of different kinds of customers. In this setting, it is very important to protect the customers from each other. If all customers are allowed full access to the resource, then one or more customers may actually submit requests at very high rates, much above their negotiated rates, which can cause other customers in other classes to experience unacceptably high blocking probabilities.

Thus, some way is needed to "protect customers from overloads by other customers." One way to do this is to "partition" the resources into separate portions dedicated to each customer, but this tends to be inefficient, because the benefits of sharing are lost. The overall capacity required in each resource tends to become unacceptably large with complete partitioning.

Another possible control scheme that allows some sharing is the rate-based multiple-class access-control scheme, such as that described in U.S. Pat. No. 5,274,644 issued on Dec. 28, 1993, to Berger, Milito and Whitt. That scheme regulates the requests admitted from different customers, but it is based solely on the pattern of requests. It does not take into account the holding times of these requests. More generally, it does not use the current state of the resources. In particular, that rate-based control does not depend on the number of requests from each customer currently in service. Here we consider situations in which this extra information is available to the resource provider. It is therefore possible to look for controls which exploit this additional information when it is available.

Moreover, many schemes, such as the rate-based multiple-class access control scheme of the above-cited Berger et al. patent only regulate the flow of customer requests. The resource provider also needs to know whether or not to allow customers to send requests. The customer admission problem is also of major concern.

Instead of complete sharing or complete partitioning, it is natural to consider various "constraints" on the allowable states in the resources that still allow some sharing. One such scheme is "trunk reservation". For example, with two classes, trunk reservation blocks one of the two classes whenever the total free capacity falls below a specified threshold. This scheme protects one of the two classes against overloads from the other, but it does not protect both classes. More generally, with n classes, a natural generalization of trunk reservation has the first k classes blocked if the total free capacity falls below a specified $k^{th}$ threshold, where there are n−1 threshold values. However, just as in the two-class case, all classes are not protected with this scheme.

Moreover, using known techniques, it is relatively difficult to calculate the customer blocking probabilities with the "trunk-reservation" scheme. The trunk-reservation scheme causes the standard model to lose the nice product-form structure which makes it possible to analyze the complete-sharing and complete-partitioning policies. Other constraints also tend to cause severe problems in computing the blocking probabilities. It is known that a large class of constraints, leading to the so-called "coordinate-convex" sharing policies, do possess product-form steady-state distributions; e.g., see J. S. Kaufman, "Blocking in a Shared Resource Environment", *IEEE Transactions on Communications*, volume COM-29, pages 1474–1481, 1981, but good algorithms for general coordinate convex policies have not been developed. Algorithms for computing customer request blocking probabilities with constraints have previously been developed in only a few very special cases.

With different customers, it is not only important to protect against overloads of others, but it is also important to be able to provide "different grades of service." Some customers may be willing to pay more to have lower blocking probabilities and stronger protection against overloads from others, while other customers would prefer to have higher blocking probabilities and weaker protection against overloads from others at a lower price.

Even achieving similar blocking probabilities is difficult, because different customers may require different numbers of resource units for each request. A customer whose requests require a larger number of resource units than another tends to have a higher blocking probability. Different grades of service can be achieved by complete partitioning, but what is needed are "more efficient" ways to provide different grades of service that allow sharing.

When considering potential schemes for providing multiple grades of service with protection against overloads, other associated problems arise. First, the resource provider wants to "assess the costs of providing given grades of service", so that an effective "pricing scheme" can be developed. There are different ways to represent such costs. One important way is to determine the average capacity on each resource used by each customer. However, when there are customers with very different requirements and grades of service, careful analysis may be required to determine the average capacity used by each customer. Crude estimates based only on average usage may fail to accurately represent the true costs. With any sharing policy that is used to provide different grades of service, the service provider would thus like to be able to calculate the average capacity used by each customer.

A successful scheme for efficiently providing multiple grades of service should address the problem of "real-time customer admission control". For given limited resources, the resource provider needs to be able to determine whether or not each prospective new customer can be admitted. With multiple grades of service, the resource provider needs to determine whether the new customer can be given his desired grade of service, with all previously admitted customers still receiving their previously determined grades of service.

Any technique for providing different grades of service presumably imposes bounds on the requests submitted by admitted customers. An efficient scheme for "enforcing" these bounds is needed. Since checking has to be done for each customer request, computational efficiency is of serious concern.

Over time, the level of customer demand often changes. There may be growing or declining demand for service. There may also be a temporary reallocation of demand in the face of "resource failure." In some resource failure situations, customers can be served by assigning them to alternative resources, but this increases the customer demand on these alternative resources. In response, the resource provider may have the opportunity to add capacity to these other resources. In face of such changing customer demand, the resource provider needs a way to determine the amount of capacity needed to meet this demand. This is the "capacity adjustment problem".

The resource provider often will have a more complicated set of options to respond to resource failure. As indicated above, customers might be able to receive service from an alternative set of resources. In some cases, this will require additional capacity that can be immediately provided at other resources, possibly at extra expense. However, in other cases, additional capacity cannot be provided quickly enough. Then the resource provider needs a way to provide the best possible service in the face of an uncontrollable resource failure. If customers who were using a failed resource can be assigned to alternative resources, then ways are needed to protect the original customers on these other resources from the diverted demand. At the same time, the resource provider would like to protect the diverted customers as well.

There are many methods to identify alternative resources available to serve customers that were using a failed resource. In some settings, the alternative resources may be evident. For example, the system may contain only two resources, with each serving as a backup for the other. In other settings, there may be an automatic procedure in place to dynamically reallocate demand to new resources, as is the case with schemes for alternative routing of blocked calls in telecommunications networks. Another possibility is that a special procedure may need to be invoked by a central controller in the event of resource failure, as in the algorithms for finding alternative routing arrangements developed by Mansour and Nguyen (U.S. Pat. No. 5,058,105). Where there is no centralized control, a distributed algorithm may be needed to first inform all resources that a failure has taken place, and then to set up appropriate alternative routes (resource assignments).

Regardless of the method used to generate alternative resource assignments, there is a need to provide some protection for both the original and diverted customers on the remaining resources.

In summary, the resource provider is faced with many problems:

How to manage and control access to a resource and efficiently provide multiple grades of service with protection against overloads?

How to provide service with different grades of service to a given set of customers using resources with given capacities?

How to assess the "cost" (in terms of resource usage, capacity, etc.) of providing a given grade of service?

How to determine in real time whether or not each prospective customer with a desired grade of service can be (or should be) admitted?

How to determine the new capacities of the resources needed to satisfy a new set of customer demands?

How to respond to a resource failure?

SUMMARY OF THE INVENTION

The present invention provides different grades of service to customers sharing a resource, and also provides protection against overloads. Each customer is assigned "upper-limit" (UL) and "guaranteed-minimum" (GM) "bounds" on its requests. The upper limit bound puts an upper limit on the number of requests from that customer that can be in service at any time. The guaranteed-minimum bound guarantees that there will always be available resource units in the resources to serve a specified number of requests from that customer. The process provides what can be called significant separation with sharing and outperforms complete partitioning and complete sharing.

Variations on the UL and GM bounds are also allowed. Alternative bounds can be based on other linear constraints on the number of active requests of different customers. These alternative bounds include UL bounds for subsets (classes) of customers.

The use of UL and GM bounds, which has been described in a special and limited context by Kamoun and Kleinrock in "Analysis of Shared Finite Storge in a Computer Network Node Environment Under General Traffic Conditions", *IEEE Transactions on Communications*, volume COM-28, pages 992–1003, 1980, leads to a coordinate-convex sharing policy, so that the resulting resource-sharing model has a product-form steady-state distribution. In accordance with the present invention, we have discovered an effective method for determining blocking probabilities in this model, so that the various problems faced by the resource-provider can be solved, and the UL/GM bounds applied in a much broader context.

While UL bounds can easily be enforced if the resource provider keeps track of the number of requests from each customer in service, the GM bounds are more difficult to enforce. This new invention includes an "efficient" scheme for enforcing both the GM and UL bounds.

The UL and GM bounds may either (a) be provided directly by the customer or (b) be determined by the resource provider to satisfy other requirements. It is assumed that the customer provides its blocking requirements and a characterization of its desired traffic. The request blocking requirement is the maximum allowed request blocking probability, assuming that all customers submit requests according to their negotiated traffic parameters.

A customer's traffic is characterized by the request arrival rate, the average request holding time, and the number of units needed on each resource. In addition, a "burstiness parameter", which describes the variability of the customer's request stream, is also allowed. The standard assumption is a Poisson arrival process. The burstiness parameter accounts for arrival processes substantially more or less bursty than a Poisson process. In addition, the customer requests can have state-dependent arrival rates or batch arrivals. A state-dependent arrival rate includes the important case of a finite-source input, i.e., requests submitted from a fixed finite population.

Customer grades of service can also be specified in another way, in particular, via "conditional blocking requirements", which are blocking requirements conditional on the other customers being in some pattern of overload. For one example, there can be a conditional blocking requirement given that any one other customer is in arbitrary overload. For another example, there can be a conditional blocking requirement given that all other customers are in overload, i.e., given that each other customer is submitting traffic at a rate above its negotiated rate. The UL and GM bounds are used to ensure that the conditional blocking requirements are met.

In order to efficiently manage shared resources with the proposed grades of service, the present invention both approximately and exactly solves the resource-sharing model with these grades of service in effect, using a "blocking probability computer" process.

As indicated above, the resource-sharing model with UL and GM bounds has a product-form steady-state distribution. To surmount the difficulty provided by the extra constraints, the present invention exploits the fact that the desired blocking probabilities can be directly expressed in terms of normalization constants (or partition function values) appearing in the product-form steady-state distribution. The process computes the normalization constants by first constructing the generating function (or z-transform) of the normalizing constant and then numerically inverting the generating function.

Since numerical inversion of the generating function can be difficult, the present invention includes a process to facilitate the inversion. The main difficulty is that the required computation grows exponentially in the dimension of the generating function. The dimension of the generating function is in turn equal to the number of resources plus the number of separate linear constraints. Since the UL and GM bounds typically correspond to a large number of linear constraints, it is necessary to simplify the problem even for a single resource.

In accordance with our process, the first step is to use a "normal approximation scheme" to approximately determine the load on each resource. This preliminary approximate analysis determines if there are some resources that are so lightly loaded that they provide essentially no constraint, so that they can be eliminated from consideration. These very lightly loaded resources are eliminated from the model before constructing the generating function.

After performing the preliminary analysis with the normal approximation, the generating function for the model with all remaining resources is formed. An explicit expression for this generating function has been determined as a function of the customer parameters.

Next the effective dimension of the generating function is reduced. A "conditional decomposition scheme" is used to determine a good order (sequence) for inverting the variables of the multidimensional generating function. The conditional decomposition scheme often can significantly reduce the effective dimension of the generating function. Indeed, this conditional decomposition step always works with the UL and GM bounds to reduce the dimension to at most two more than the dimension with the complete-sharing policy. If there is only a single resource, then the resulting model is almost always solvable.

If there are a substantial number of resources, then the model may still not be solvable after the normal approximation and conditional decomposition steps. If the model is not yet solvable, then a "reduced-load fixed-point approximation process" is used to approximately solve the model. While the general idea of reduced-load fixed-point approximation schemes is known, our invention uses a new subroutine based on the blocking probability computer process to exactly solve the single-resource submodels having UL and GM bounds. The new subroutine may also be used to exactly solve models involving subsets of more than a single resource.

After the three problem-reduction steps are completed, the numerical inversion is performed to calculate the blocking probabilities. This is either done directly, if the model is directly solvable, or indirectly as part of a subroutine within the reduced-load fixed-point approximation scheme. In accordance with our invention, the inversion exploits (a) a Fourier-series method, (b) an effective scaling algorithm especially tailored to the resource-sharing model, (c) truncation, (d) an efficient treatment of multiplicities, and (e) shared-computation of normalization constants when there are many classes and large resource capacities, to obtain significant computational speedup.

With the arrangement just described, the blocking probability computer determines whether proposed grades of service can be provided to a given set of customers using resources with given capacities.

In one specific embodiment of the present invention relating to real-time admission control, the blocking probability computer is used to determine in real time whether each new prospective customer can be admitted to a resource with a desired grade of service. The first step in the process is to determine the desired grade of service for the prospective customer, yielding proposed customer traffic parameters and UL and GM bounds. The blocking probability computer then determines if all blocking requirements (conditional and unconditional) can be met considering both the prospective customer and all existing customers. If all blocking requirements can be met, then the resource provider admits the new customer with the desired grade of service. If all blocking requirements cannot be met, then the blocking probability computer is used to determine if a lower grade of service is feasible.

The present invention also uses the blocking probability computer to make appropriate capacity adjustments to meet changes in customer demand. Given a new set of prospective customers with specified resources and grades of service, the blocking probability computer finds appropriate resource capacities. A normal approximation scheme is first used to find an upper bound on the feasible capacities. Then the capacities are steadily decreased, with the UL and GM bounds changed as necessary. The blocking probability computer is used to evaluate each candidate. The process yields feasible capacities that are as small as can be found by this method.

The present invention also uses the blocking probability computer to determine an effective response to resource failure, so that customers who were using one of the failed resources can have their demand satisfied on the remaining resources. The blocking probability computer then determines if the new arrangement is feasible. If it is not feasible, then the resource provider considers capacity expansions. If capacity expansions are not possible, then an attempt is made to divert proportions of the traffic on successive sets of alternative resources. The blocking probability computer is used to determine the feasible proportions. Then the UL and GM bounds are used to provide appropriate protection for the original and diverted customers.

BRIEF DESCRIPTION OF THE DRAWINGS

FIG. 12 is a flow diagram illustrating the traffic diversion process performed in the system of FIG. 11.

DETAILED DESCRIPTION

There are three principal aspects of our technique for providing multiple grades of service with protection against overloads in shared resources, namely: (A) real-time customer admission control (B) adjustment of resource capacities and control bounds, and (C) response to resource failures. All three exploit the upper-limit (UL) and guaranteed-minimum (GM) bounds and the blocking probability computer. Each of the three aspects are discussed in turn below. The blocking probability computer is discussed in conjunction with the admission control in Section A.

A. Real-Time Customer Admission Control

Figure 2:
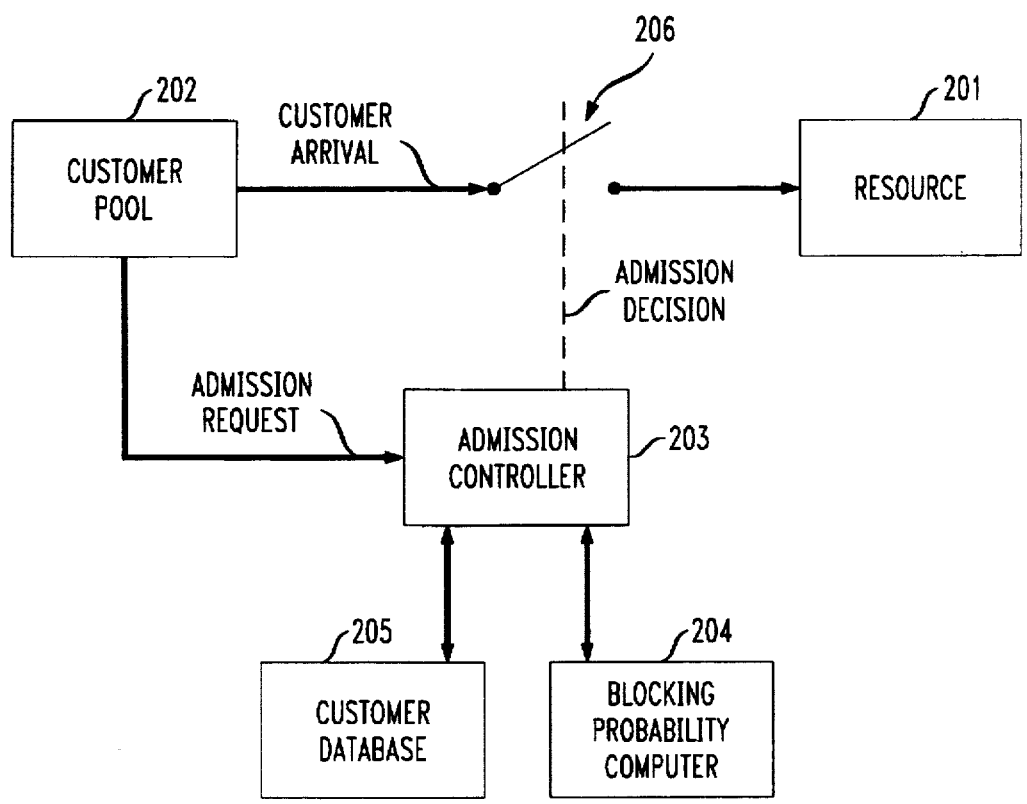
FIG. 2 is a block diagram of an admission control system arranged in accordance with the principles of the present invention.

A block diagram of an admission control system arranged in accordance with the present invention is shown in FIG. 2. A resource 201 (which could have multiple components, each with multiple units), handles arrivals from a source of customers called a customer pool 202. From time to time, customers from customer pool 202 wish to be admitted to (receive service from) resource 201. The decision whether or not to admit the customer is made by an admission controller 203, which signals a switch 206 to close or open, so as to either connect a customer arrival from customer pool 202 to resource 201, or to deny a customer arrival access to resource 201. Admission controller 203 also determines the grade of service, including the upper limit (UL) and guaranteed minimum (GM) bounds. When a customer wishes to be admitted to resource 201, the customer makes an admission request to admission controller 203. At this time, the customer indicates his desired traffic parameters and grade of service, including blocking requirements. Admission controller 203 then invokes blocking probability computer 204 to determine whether the new customer should be admitted, with what UL and GM bounds, and at what price. For this purpose, a mathematical model of the resource-sharing system is constructed, which includes all existing customers as well as the new customer. The relevant data about existing customers is obtained by admission controller 203 from a customer database 205. If the results of the calculations performed by blocking probability computer 204 indicate that all blocking probabilities are less than the blocking requirements, then the new customer can be admitted. This decision is implemented and communicated to the customer by admission controller 203.

Figure 3:
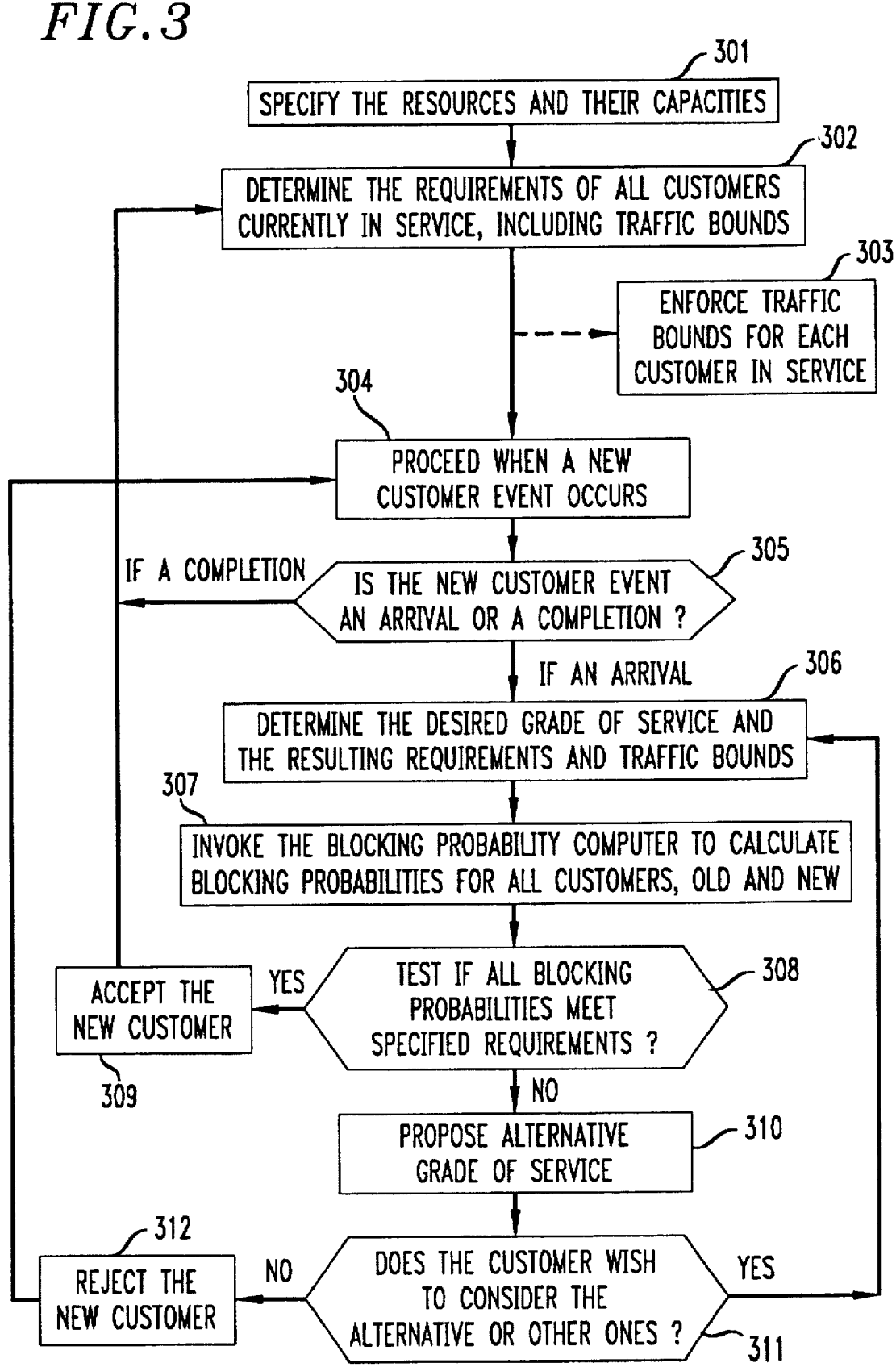
FIG. 3 is a flow diagram illustrating the admission control process performed by the admission control system of FIG. 2.

A flow diagram depicting an overview of the admission control process in accordance with the present invention is given in FIG. 3. The process is initiated by specifying the resources and their capacities in step 301. There are p resources. (Even the case p=1 is of major interest.) Resource i has capacity $K_i$, $1 \leq i \leq p$; i.e., resource i has $K_i$ resource units. (It is assumed that p, $K_1, \ldots, K_p$ are positive integers.)

Next, in step 302, the requirements of all customers currently in service are determined. The specific requirements are described in conjunction with the explanation of Step 306 below. To determine the requirements of all customers currently in service, the resource provider would update a customer database upon each new customer arrival or departure. The customer database contains a record of all customers in service including the parameters of their grade of service.

Given that grades of service are provided by using UL and GM bounds, it is necessary to enforce these traffic bounds on an ongoing basis for each customer in service. This function is performed in step 303, and, is described in more detail below. This step is not part of the main process flow because we are here concerned with the decision whether or not to admit customers. In contrast, enforcing traffic bounds is concerned with the decision whether or not to admit requests submitted by customers already admitted and permitted to submit requests.

When a new customer event occurs, a "proceed" signal is generated in step 304, causing the process to move to step 305. If the new event is the completion of service of an existing customer, then that customer data must be removed from the customer database, and the process returns to step 302. Although not specifically shown in FIG. 3, if a customer wishes to renegotiate their grade of service, this is treated as a completion of service request. Note that the customer or the system may monitor the customer's actual request traffic and determine that the customer requires different traffic parameters, e.g., a higher or lower request arrival rate. Customers who want to change their grade of service can be thought of as a service completion followed immediately by a new arrival.

If the result of step 305 indicates a new arrival, then, in step 306, the desired grade of service and the resulting requirements and traffic bounds are determined. The grade of service includes a characterization of the request traffic. The standard characterization of a customer's request traffic is via the request arrival rate and the average request holding time. Indeed, it is only necessary to know the product of these parameters, which is called the offered load.

However, it is also possible to have more elaborate traffic characterizations. In addition to the characterization above, there can be a traffic variability parameter, called the "peakedness". The peakedness describes the variability of the request stream. Peakedness is important for treating overflow processes, as occur with alternative routing. (The way to work with peakedness is described below.)

Alternatively, the traffic for customer j can be characterized by arrival-rate and service-rate functions $\lambda_j(k)$ and $\mu_j(k)$. Then $\lambda_j(k)$ is the arrival rate of requests when k requests from customer j are active and $\mu_j(k)$ is the service (completion) rate of requests when k requests from customer j are active. The standard case is $\lambda_j(k)=\lambda_j$ and $\mu_j(k)=k\mu_j$, corresponding to a constant arrival rate for the customer and a constant service rate per active request. An arrival rate of the form $\lambda_j(k)=\alpha_j-k\beta_j$ covers the case of input from a finite source. The blocking probability computer applies with general state-dependent arrival and service rates as well as in the standard case.

The standard case corresponds to having peakedness 1. Other peakedness parameters are treated approximately by constructing appropriate state-dependent arrival rates. An effective way to convert peakedness input into state-dependent arrival rates, and then calculate blocking probabilities, is described below.

In step 306, the customer also specifies a requirements vector $\bar{b}_j=(b_{1j},\ldots,b_{pj})$. The parameter $b_{ij}$ indicates that each request from customer j requires $b_{ij}$ units of resource i. (It is assumed that $b_{ij}$ is a nonnegative integer for each i and j. In order to have the blocking probability computer perform efficiently with guaranteed minimum bounds, it is assumed that $b_{ij}$ is either $b_j$ or 0; i.e., the positive entries of $\bar{b}_j$ assume a constant value.)

The grade of service also includes blocking requirements. First, there is the nominal blocking requirement, which is the desired blocking probability for requests from customer j, assuming that all customers submit requests at their nominal rates. Second, there may also be conditional blocking requirements, which are blocking probability specifications assuming that one or more other customers are sending requests in excess of their negotiated rates. Customers may also specify their grade of service directly through the UL and GM bounds. If so, these bounds may still need to be altered to meet the blocking requirements. If a customer specifies a UL or GM bound, then the network provider is free to choose any values for these bounds greater than or equal to the bounds specified by the customer.

After step 306 is complete, the blocking probability computer is used in step 307 to calculate the blocking probabilities of all customers, old and new, to determine if all blocking requirements can be met. The blocking probability computer is described in more detail below. It also may be necessary for the resource provider to introduce new UL and GM bounds for the new customer in order to meet the blocking requirements, nominal and conditional, of this new customer and the existing customers. The new bound assignment can be done in a manner similar to the way UL and GM bounds are adjusted in the capacity adjustment process, which is described in detail in Section B below.

Next, in step 308 a test is performed to determine if the blocking requirements can be met. If a "YES" result occurs, the new customer is accepted in step 309, and the process returns to step 302. On the other hand, if any computed blocking probability is greater than its requirement, the requirements for admission are not met, and the result of step 308 is a "NO". Then, as indicated in step 310, the blocking probability computer is used to determine if one or more alternative grades of service can be provided. The modified requirements might, for example, have lower arrival-rate function, lower upper-limit bound or lower guaranteed-minimum bound.

After the alternative grades of service are proposed in step 310, a determination is made in step 311 as to whether one of those alternatives is acceptable to the customer. If yes, the process returns to step 306, where the new parameters are used to determine the grade of service. On the other had, if the result in step 311 is "NO", the new customer is rejected in step 312, and the process returns to step 304 to await a new customer event.

Figure 4:
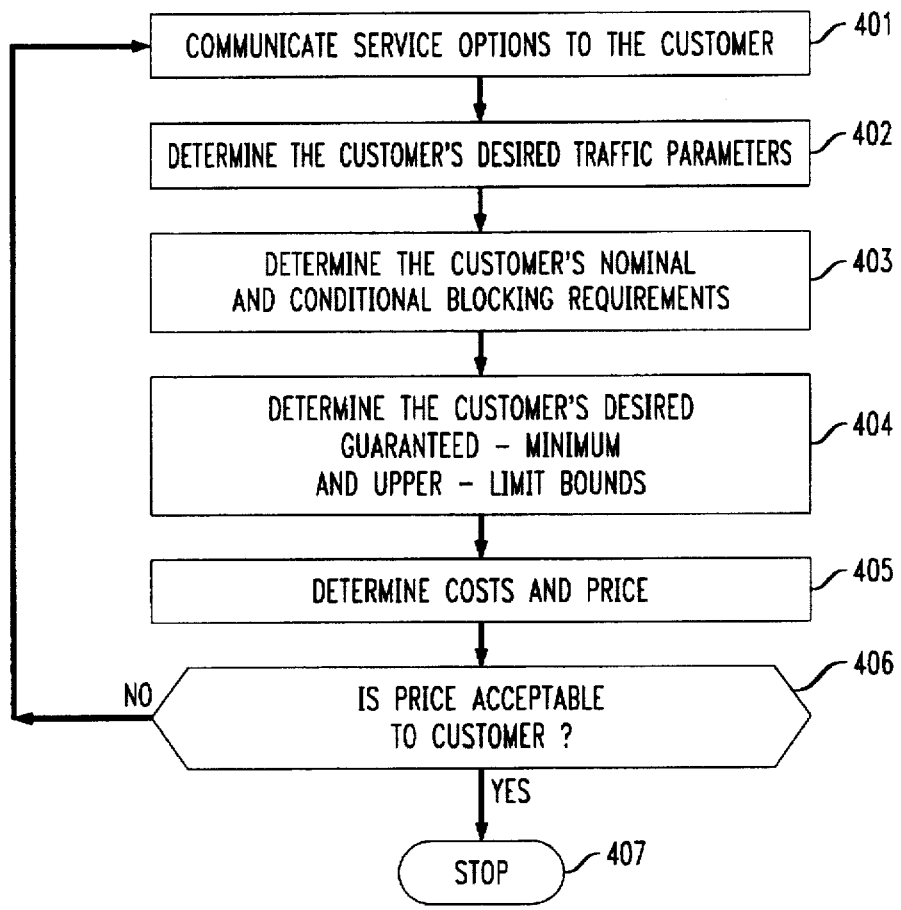
FIG. 4 is a flow diagram illustrating a process for determining new customer requirements.

The grade of service determination performed in step 306 of FIG. 3 is described in further detail in FIG. 4. The process begins in step 401, when the available service options are communicated to the customer. The system may provide a fixed finite set of pre-specified grades of service at pre-specified prices, or it may design a new grade of service tailor-made for each customer. Customers are informed of the policy.

Next, in step 402 the system receives input from the customer. Given a specification of the proposed grade of service, the resource provider computes an estimate of the cost and tells the customer the price in step 405. Ways to estimate the cost are described below. At this point, in step 406, the resource provider determines if the price is acceptable to the customer.

Figure 5:
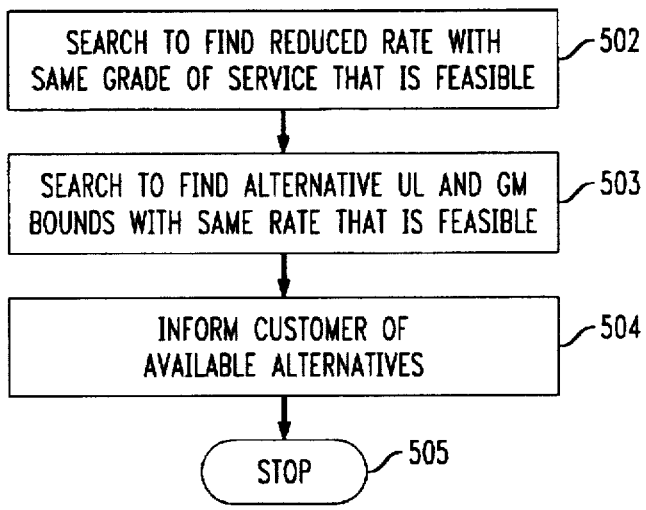
FIG. 5 is a flow diagram illustrating the process for generating alternative grades of service when a requested grade of service is not feasible.

The requirement modification procedure used to propose alternative grades of service in step 310 of FIG. 3 is described in more detail in FIG. 5. This process is initiated in step 308 when a new customer's requirements are found to be infeasible. The process first looks in step 502 for a reduced request submission rate for prospective customer j that is feasible. If the original request rate is $\lambda_j$, then the new request rate would be $\alpha\lambda_j$ for some $\alpha$, $0<\alpha<1$. In order to have associated new UL and GM bounds that impose similar constraints with the new arrival rate, the UL and GM bounds are changed to keep $\alpha\lambda_j+c\sqrt{\alpha\lambda_j}$ constant, where c is the value associated with the case $\alpha=1$. The peakedness parameter, if any, is left unchanged. Since the search is only over the arrival rate, it is relatively elementary, i.e., binary search can be used. For each candidate rate $\alpha\lambda_j$, the blocking probability computer is used to check feasibility. If only a finite set of rates are available, then the search is over this set.

Next, in step 503, another feasible alternative is generated by keeping the initial rate fixed but changing the GM and UL bounds. First decrease the GM bound and see if a feasible solution can be obtained. If possible, find the maximum feasible GM bound by doing a search. If eliminating the GM bound does not produce a feasible solution, then set the GM bound equal to 0 and reduce the UL bound. Then do another search to find the maximum feasible UL bound. Then raise the GM bound to the minimum value of the previous GM bound and the highest value that does not affect feasibility. This scheme produces a new pair of UL and GM bounds with the same arrival rate that is feasible. The procedure to generate alternative grades of service stops in step 505.

The two alternatives generated in steps 502 and 503 are offered to the customer in step 310. The customer and resource provider might also wish to consider other alternatives that can be checked for feasibility as well. If a feasible alternative is acceptable to the customer, then the customer is admitted (step 309 of FIG. 3).

As indicated in step 303 of FIG. 3, providing multiple grades of service with UL and GM bounds requires that these bounds be enforced on an ongoing basis. The overall procedure for efficiently enforcing the traffic bounds is shown in FIG. 6.

Advantageously, this process checks the guaranteed-minimum bounds in an efficient manner. In particular, the computational complexity at each request event is of the same order as the number of resources used by the customer making that request. This is much less complex than a scheme which requires computation complexity of the order equal to the product of the total number of resources and the total number of active classes, which might be quite large.

Figure 6:
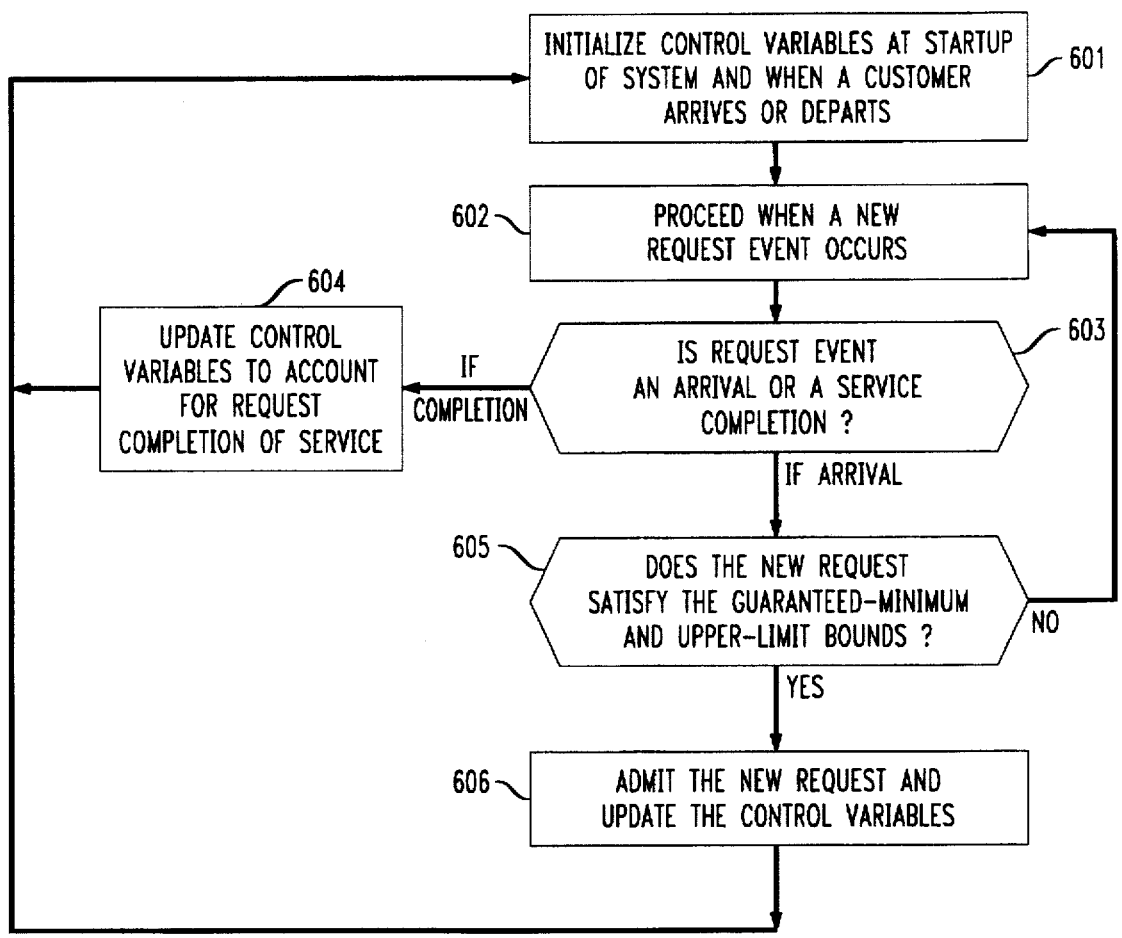
FIG. 6 is a flow diagram illustrating the process by which traffic bounds are enforced.

In FIG. 6, the first step 601 in enforcing the traffic bounds is initializing the control variables at startup of the system and when a customer arrives or departs. The customer and system parameters are:

p—number of resources
r—number of customers
$K_i$—capacity of resource i
$L_j$—guaranteed-minimum bound on the requests from customers j
$U_j$—upper-limit bound on the requests from customer j
$b_{ij}$—number of units in resource i required by each request of customer j A key variable is the number $n_j$ of active requests for customer j. Before any request arrivals, the value is $n_j=0$.

Also, for efficient updating, another key variable is the number $F_i$ of free units in resource i for each i. The initial value of $F_i$ is the total number of units minus the number required by guaranteed minimum bounds, i.e., $$F_i = K_i - \sum_{j=1}^{r} L_j b_{ij}. \quad (1)$$

The process of FIG. 6 waits at step 602 until a new request event occurs, and then proceeds to step 603. If it is determined in step 603 that a customer-j request completes service and departs, variables $n_j$ and $F_i$ are updated as follows:

(i) $n_j=n_j-1$
(ii) For all i such that $b_{ij}>0$, if $n_j \geq L_j$, then $F_i=F_i+b_{ij}$.
Otherwise do not change $F_i$.

If it is determined in step 603 that a new customer-j request arrived, the new customer-j request is admitted if it is determined in step 605 that the new request satisfied the UL and GM bounds, so that both (i) $n_j \leq U_j-1$ and
(ii) for each i such that $b_{ij}>0$, $n_j b_{ij} \leq F_i + L_j b_{ij} - b_{ij}$.

If a NO result occurs in step 605, the customer-j request is not admitted. If the customer-j request is admitted in step 605, the variables are updated in step 606 as follows:

(i) $n_j=n_j+1$
(ii) For each i such that $b_{ij}>0$, if $n_j>L_j$, then $F_i=F_i-b_{ij}$.

When the system starts with some initial number of requests, $F_i$ must be computed for each i, using $$F_i = K_i - \sum_{j=1}^{r} max\{L_j b_{ij}, n_j b_{ij}\}. \quad (2)$$

The overall computational complexity is O(rp). At each subsequent request arrival/departure event of a customer-j request, a computation which has computational complexity O(q) is performed where q is the number of resources used by customer j. In some applications, r and p will both be large, while q is still small. Accordingly, there may be a one-time large start-up computation, but at each request arrival/departure instant the amount of computation remains low and is of the same order as that for other simple request admission policies, such as complete-sharing and trunk reservation.

We now discuss ways to determine the cost of providing service to a new customer. There are several possible interpretations for cost of providing service to a new customer, even if we focus only on the capacity used on each resource. Clearly, the minimum capacity used is the guaranteed-minimum bound GM, and the maximum capacity used is the upper limit bound UL. It is natural to look for a notion of "expected capacity used", which should fall between these two extremes.

One expected cost expression is the marginal expected cost, which is the extra capacity required in a resource beyond what is required for all other customers using that resource, assuming that all customers submit requests according to their specified parameters. The marginal expected cost can be determined by first finding the minimum capacity of the resource, such that all current customer requirements can be met, and then finding the minimum capacity of the resource such that the requirements of all current customers plus the new customer can be met. The marginal expected cost of providing service to this customer on this resource is the difference between these two capacity levels. The blocking probability computer can be used to determine the two critical capacity levels, just as in the capacity adjustment procedure.

Another expected cost expression is the first-customer expected cost, which is the average capacity used if that customer were the only customer using the resource. This cost can be determined by finding the minimum capacity of the resource such that the customer's requirements can be satisfied, assuming that no other customers are present and that this customer submits requests according to its agreed-upon traffic parameters. The first-customer expected cost will typically be higher than the marginal expected cost, because there is less sharing. This first-customer expected cost can also be determined by invoking the blocking probability computer, just as with the marginal expected cost. The calculation is easier with only a single customer.

It is also possible to use the normal approximation to obtain very rapid capacity requirement estimations for evaluating the two expected costs above. The normal approximation can be used as described below to estimate the required capacity in order to eliminate very lightly loaded resources from the model before performing numerical inversion.

We now discuss a treatment of different kinds of arrival-process variability. The usual assumption is that each customer's request arrival process can be reasonably modeled as a Poisson process. Then each request arrival process can be specified by simply giving the arrival rate. A Poisson process is often an appropriate model, but sometimes the request arrivals are in fact significantly more or less variable or "bursty" than in a Poisson process. For example, when requests are actually overflows of unsatisfied requests to another resource, they tend to arrive in a process that is more bursty than a Poisson process. A way to characterize non-Poisson processes is via the peakedness parameter, described by A. E. Eckberg, "Generalized Peakedness of Teletraffic Processes", *Proceeding of the Tenth International Teletraffic Congress*, Montreal, Canada, Paper 4.4b.3, and L. E. N. Delbrouck, "A Unified Approximate Evaluation of Congestion Functions for Smooth and Peaky Traffic", *IEEE Transactions on Communications*, volume 29, pages 85–91, 1981. "Peakedness" is defined as the ratio of the variance to the mean number of active requests in the associated infinite-capacity resource. For the case of Poisson arrivals, the number of requests in service has a Poisson distribution when there is no capacity limit. Since the variance equals the mean in a Poisson distribution, the peakedness is 1 for a Poisson arrival process. For a more bursty arrival process, the peakedness is greater than 1, while for a less bursty arrival process, the peakedness is less than 1.

Beginning with R. I. Wilkinson in "Theories for Toll Traffic Engineering in the U.S.A.", *Bell System Technical Journal*, volume 35, No. 2, pages 421–514, 1956, several researchers have made the observation that the number of active requests in a finite-capacity resource tends to have a truncated Pascal (or negative binomial) distribution for sources burstier than Poisson and a binomial distribution for sources smoother than Poisson, for any resource capacity. Exploiting this observation, L. E. N. Delbrouck in the reference cited earlier, developed accurate approximations for blocking computation in the context of single-rate, single-resource systems with the complete-sharing policy. We generalize that method in our more general setting.

The basic idea is to use a linear state-dependent arrival-rate function $\lambda_j(k)=\alpha_j+k\beta_j$, since this arrival process, known as a BPP process, produces a number of busy servers in an infinite-capacity resource distributed as Pascal for $\beta_j>0$ and as binomial for $\beta_j<0$. (Moreover, the BPP model falls within the scope of our blocking probability computer.) The parameters $\alpha_j$ and $\beta_j$ of the BPP process are determined by matching the mean and variance of the number of class-j requests in service at an arbitrary time in an infinite-capacity resource, i.e., a system without any capacity constraints. Specifically, let $M_j$ and $V_j$ represent the mean and variance quantities mentioned above for the actual arrival process corresponding to customer j. It can be shown that these quantities for the approximating BPP process are $$M_j = \frac{\alpha_j}{\mu_j - \beta_j} \quad (3)$$

and $$V_j = \frac{\mu_j \alpha_j}{(\mu_j - \beta_j)^2} \quad (4)$$

From the above, the two BPP parameters are $$\alpha_j = M_j \mu_j / z_j \quad (5)$$

and $$\beta_j = \mu_j (z_j - 1) / z_j \quad (6)$$

where $$z_j = \text{peakedness} = V_j / M_j. \quad (7)$$

The quantity $M_j$ is the offered load and is easily computable for most arrival processes. Also, for most common arrival processes, the peakedness parameter is readily computable as well, as indicated by A. E. Eckberg (cited above). These parameters can also be estimated from data.

Having obtained $\alpha_j$ and $\beta_j$, we wish to compute the blocking probabilities. This could be done directly by applying the blocking probability computer, but as noted by Delbrouck (cited earlier), a better approximation is obtained if we calculate the blocking probability indirectly via the mean number of active requests in the finite-capacity system with the BPP arrival process. Hence, the next step is to compute $m_j$, the mean number of class-j requests in service in the actual system with capacity constraints. It can be shown that $m_j$ is given by $$m_j = (\alpha_j / \mu_j) \frac{\bar{g}(K - Be_j n_j, U - e_j, N - Be_j n_j)}{g(K, M, N)}, \quad (8)$$

where $e_j$ is a vector with a 1 in the $j^{th}$ place and 0's elsewhere, the symbol $\bar{g}$ in the numerator of Equation 8 implies that we have to consider a system with $\alpha_j$ replaced by $\alpha_j + \beta_j$ and the rest of the parameters are defined below. Note that this replacement is only for computing the numerator normalization constant and not the denominator one.

Hence $m_j$ is readily computable by the blocking probability computer. Finally, the expression for call blocking is $$B_j = 1 - \frac{m_j}{M_j} = 1 - \left(1 - \frac{\beta_j}{\mu_j}\right) \frac{\bar{g}(K - Be_j n_j, U - e_j, N - Be_j n_j)}{g(K, U, N)} \quad (9)$$

We now turn to the blocking probability computer, which is depicted in FIG. 2 and is invoked in step 307 of the admission control process in FIG. 3. (It plays a prominent role in Sections B and C below as well.) The blocking probability computer process depicted in step 307 of FIG. 3 is described in more detail in FIG. 7.

The process performed in the blocking probability computer requires the following resource-sharing inputs, which are obtained in step 701:

p—number of resources
r—number of customers
$K_i$—Capacity of resource i, $1 \leq i \leq p$
$b_j$—number of units required on each resource use by customers j $$\delta_{ij} = \begin{cases} 1 & \text{if customer } j \text{ uses resource } i \\ 0 & \text{otherwise} \end{cases}$$

B—matrix with $b_{ij} = \delta_{ij} b_j$
$U_j$—UL bound on requests from customer j, $1 \leq j \leq r$,
$L_j$—GM bound on requests from customer j
$N_j$—number of units guaranteed for customer j, $N_j = L_j b_j$
$K = (K_1, \ldots, K_p)$—capacity vector
$U = (U_1, \ldots, U_r)$—UL bound vector
$N = (N_1, \ldots, N_r)$—GM bound vector If the model is too large to efficiently solve directly, a normal-approximation process is invoked in step 702 in order to produce an essentially equivalent smaller model. The approximate analysis looks for resources that are so lightly loaded that they impose no significant constraint, and a smaller model is made by eliminating these resources. This normal approximation scheme for eliminating lightly loaded resources is described in further detail below.

Next, in step 703, the generating function of the normalization constant associated with the product-form steady-state distribution is formed. First, the set of allowable states is $$S(K, U, N) = \left\{ n \in Z_+^r : Bn \leq K, n \leq U, \sum_{j=1}^{r} (b_j n_j \hat{\delta}_{ij} n_j) \leq K_i, 1 \leq i \leq p \right\},$$

where $Z_+^r$ is the set of state vectors, $n = (n_1, \ldots, n_r)$, $n_j$ is the number of customer-j requests in service and $\Lambda$ represents the maximum of the variables on both sides of the $\Lambda$. The steady-state distribution is then $$\pi(n) = g(K,U,N)^{-1} f(n), \quad (10)$$

where $g(K,U,N)$ is the normalization constant and $$f(n) = \prod_{j=1}^{r} f_j(n_j), \quad (11)$$

with $$f_j(n_j) = \Lambda_j(n_j)/M_j(n_j),$$

$$\Lambda_j(n_j) = \prod_{k=0}^{n_j-1} \lambda_j(k),$$

$$M_j(n_j) = \prod_{k=1}^{n_j} \mu_j(k),$$

$\lambda_j(k)$ the arrival-rate function and $\mu_j(k)$ the service rate function. Then the normalization constant is $$g(K, U, N) = \sum_{n \in S(K,U,N)} f(n). \quad (12)$$

The generating function of the normalization constant $g(K, U, N)$ is $$G(z, y, z) \equiv \quad (13)$$

$$\sum_{K_1=0}^{\infty} \cdots \sum_{N_r=0}^{\infty} g(K, U, N) z_1^{K_1} \ldots z_p^{K_p} y_1^{U_1} \ldots y_r^{U_r} x_1^{N_1} \ldots x_r^{N_r},$$

where $z=(z_1, \ldots, z_p)$, $y=(y_1, \ldots, y_r)$ and $x=(x_1, \ldots, x_r)$ are vectors of complex variables. The generating function in Equation 13 has the form $$G(z,y,x) = \prod_{j=1}^{r} (1-z_j)^{-1} \prod_{j=1}^{r} G_j(z,y,x), \quad (14)$$

where $$G_j(z,y,x) = (1-y_j)^{-1}[(1-x_j \prod_{i=1}^{r} P_{z_i}^{\delta_{ij}})^{-1} F_j(y_j x_j^b \prod_{i=1}^{r} P_{z_i}^{\delta_{ij}}) + (1-x_j)^{-1} F_j(y_j \prod_{i=1}^{r} P_{z_i}^{\delta_{ij}}) - (1-x_j)^{-1} F_j(y_j x_j^b \prod_{i=1}^{r} P_{z_i}^{\delta_{ij}})] \quad (15)$$

and $$F_j(x) \equiv \sum_{j=0}^{\infty} f_j(n_j) x^{n_j}, \quad (16)$$

where x in Equation 16 is a single complex variable.

In the standard (Poisson) case with $\lambda_j(k)=\lambda_j$, $\mu_j(k)=k\mu_j$ and $\rho_j=\lambda_j/\mu_j$, the generating function $F_j(x)$ is given by:

$$F_j(x) = \exp(\rho_j x). \quad (17)$$

In the so-called binomial and Pascal cases with $\lambda_j(k)=\alpha_j + \beta_j k$ where $\beta_j \neq 0$ and $r_j = \alpha_j/\beta_j$, and still $\mu_j(k)=k\mu_j$, the generating function $F_j(x)$ in Equation 16 is given by:

$$F_j(x) = (1-\beta_j x/\mu_j)^{-r_j}. \quad (18)$$

For the special case in which $\lambda_j(k)=\lambda_j$ and $\mu_j(k)=\mu_j$, $f_j(n_j)=\rho_j^{n_j}$ the generating function $F_j(x)$, in Equation 16 is given by:

$$F_j(x) = (1-\rho_j x)^{-1}. \quad (19)$$

The closed-form expressions for $F_j(x)$ in Equations 17 through 19 make it easier to calculate the generating function values in Equation 15, and thus in Equation 14. However, even in the general case, the infinite sum in Equation 16 can always be truncated without loss of generality. Because of the finite capacity limits, it suffices to assume that $\lambda_j(n_j)=0$ for suitably large $n_j$, so that $f_j(k)=0$ for all $k \geq n_j+1$.

Figure 7:
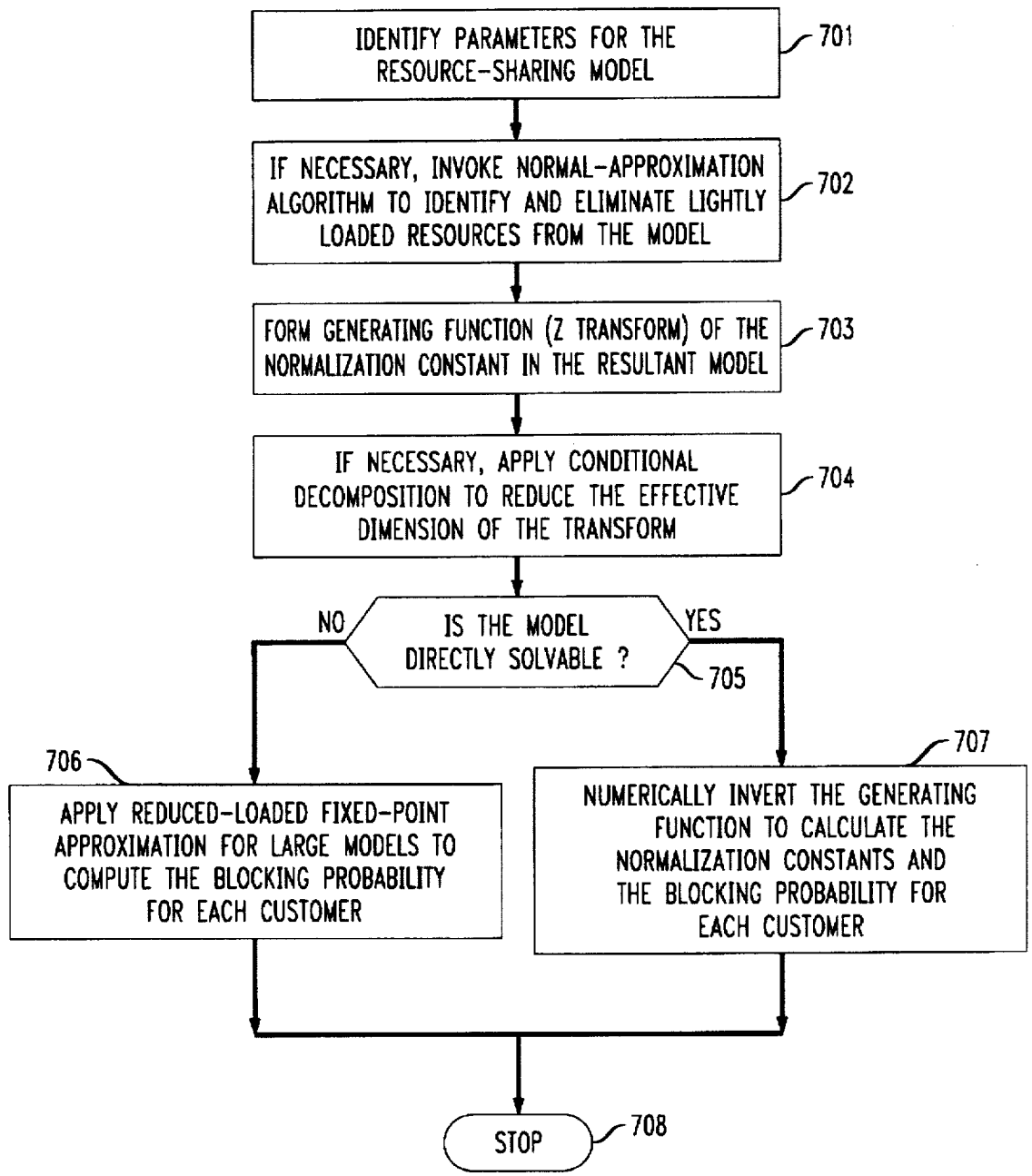
FIG. 7 is a flow diagram illustrating the process by which blocking probability computer 204 of FIG. 2 operates.

Even though some resources may have been eliminated from the process in step 702 in FIG. 7, the resulting process may still be too complex to solve directly. This difficulty is primarily due to the dimension of the generating function formed in step 703 being too large. When the dimension is too large, a good conditional decomposition is sought to reduce the effective dimension of the generating function. The procedure for finding a good conditional decomposition to achieve dimension reduction is described below.

Applying steps 702 and 704, a determination is made in step 705 as to whether blocking probabilities can be computed. If the result is "NO", a reduced-load fixed-point approximation is invoked in step 706. The blocking probability computer is actually used in this step too, as described in more detail below.

If the result in step 705 is "YES", the generating function is inverted in step 707. The inversion can be done in different ways. One effective inversion technique that exploits the Fourier-series method is described in J. Abate and W. Whitt, "The Fourier-Series Method for Inverting Transforms of Probability Distributions," *Queueing Systems*, volume 10, pages 5–88, 1992, and in G. L. Choudhury, D. M. Lucantoni and W. Whitt, "Multidimensional Transform Inversion With Applications to the Transient M/G1 queue," *Annals of Applied probability*, volume 4, pages 719–740, 1994.

Suppose that a p-dimensional generating function $$G(z) = \sum_{K_1=0}^{\infty} \cdots \sum_{K_p=0}^{\infty} g(K) z_1^{K_1} \ldots z_p^{K_p} \quad (20)$$

is to be inverted. It is assumed that conditional decomposition has already been done to determine a good order in which the variables should be inverted. The procedure then is to perform up to p one-dimensional inversions recursively.

To represent the recursive inversion, let the partial generating functions be $$g^{(j)}(z_j, K_{j+1}) = \sum_{K_1=0}^{\infty} \cdots \sum_{K_j=0}^{\infty} g(K) \prod_{i=1}^{j} z_i^{K_i} \text{ for } 0 \leq j \leq p, \quad (21)$$

where $z_j=(z_1, z_2, \ldots, z_j)$ and $K_j=(K_j, K_{j+1}, \ldots, K_p)$ for $1 \leq j \leq p$. Let $z_0$ and $K_{p+1}$ be null vectors. Clearly, $K=K_1$, $z=z_p$, $g^{(p)}(z_p, K_{p+1})=G(z)$ and $g^{(0)}(z_0, K_1)=g(K)$.

Let $I_j$ represent inversion with respect to $z_j$. Then the step-by-step nested inversion approach is $$g^{(j-1)}(z_{j-1}, K_j) = I_j[g^{(j)}(z_j, K_{j+1})], \quad 1 \leq j \leq p, \quad (22)$$

starting with $j=p$ and decreasing $j$ by 1 each step. In the actual program implementation, the inversion in Equation 22 is attempted for $j=1$. In order to compute the righthand side, another inversion with $j=2$ is needed. This process goes on until at step p the function on the righthand side becomes the p-dimensional generating function and is explicitly computable.

Shown below is the inversion formula at the $j^{th}$ step. For simplicity, those arguments which remain constant during this inversion are suppressed, letting $g_j(K_j)=g^{(j-1)}(z_{j-1}, K_j)$ and $G_j(z_j)=g^{(j)}(z_j, K_{j+1})$. With this notation, the inversion formula (Equation 22) is $$g_j(K_j) = \frac{1}{2l_j K_j r_j^{K_j}} \sum_{k=-l_j K_j}^{l_j K_j - 1} G_j(r_j e^{\pi i k/l_j K_j}) e^{-\pi i k/l_j} - e_j, \quad (23)$$

where $i=\sqrt{-1}$, $1_j$ is a positive integer, $r_j$ is a positive real number and $e_j$ represents the aliasing error, which is given by $$e_j = \sum_{n=1}^{\infty} g_j(K_j + 2nl_j K_j) r_j^{2nl_j K_j}. \quad (24)$$

Note that, for $j=1$, $g_1(K_1)=g(k)$ is real, so that $G_1(\bar{z}_1)=\overline{G_1(z_1)}$. This enables the computation in Equation 23 to be reduced by about one half.

To control the aliasing error in (24), let $r_j=10^{-a_j}$ for $a_j=A_j/(2l_j K_j)$. Then Equation 24 becomes $$e_j = \sum_{n=1}^{\infty} g_j(K_j + 2nl_jK_j)10^{-l_jn}. \quad (25)$$

A bigger $\lambda_j$ in Equation 25 decreases the aliasing error. The parameter $l_j$ controls roundoff error, with bigger values causing less roundoff error. An inner sum of the inversion requires more accuracy than an outer sum, since the inverted values in an inner sum are used as transform values in an outer sum. With a goal of about eight significant digit accuracy, the following sets of $l_j$ and $\lambda_j$ typically are adequate: i) $l_1=1$, $\lambda_1=11$, ii) $l_2=l_3=2$, $\lambda_2=\lambda_3=13$, iii) $l_4=l_5=l_6=3$, $\lambda_4=\lambda_5=\lambda_6=15$, assuming that computations are done using double-precision arithmetic. It is usually not a good idea to use the same $l_j$ for all j, because then more computation is done to achieve the same accuracy.

When the inverse function is a probability, the aliasing error $e_j$ in Equation 25 can easily be bounded because $g_j(K_j) \leq 1$. In contrast, here the normalization constants may be arbitrarily large and therefore the aliasing error $e_j$ may also be arbitrarily large. Thus, the generating function is scaled in each step by defining a scaled generating function as $$\bar{G}_j(z_j) = \alpha_{0j} G_j(\alpha_j z_j), \quad (26)$$

where $\alpha_{0j}$ and $\alpha_j$ are positive real numbers. This scaled generating function is inverted after choosing $\alpha_{0j}$ and $\alpha_j$, so that the errors are suitably controlled. The inversion of $\bar{G}_j(z_j)$ in Equation 26 yields the scaled normalization constant $$\bar{g}_j(K_j) = \alpha_{0j}\alpha_j^{K_j} g_j(K_j). \quad (27)$$

An effective scaling procedure is described in more detail below. For large models, the computation can be speeded up by exploiting multiplicities, by judiciously truncating large finite sums, and by simultaneously computing many closely related normalization constants, with the bulk of the computation shared. These techniques are described in more detail below. Finally, it remains to calculate the blocking probabilities themselves. This step is also performed in step 707, and is described in more detail below.

Turning now to the issue of scaling, it is noted that the aliasing error in the numerical inversion is controlled by scaling the generating function at each step. In the $j^{th}$ step of a p-dimensional inversion, a scaled generating function is defined in Equation 26. This scaled generating function is inverted after choosing $\alpha_{0j}$ and $\alpha_j$ so that the errors are suitably controlled. The parameters $\alpha_{0j}$ and $\alpha_j$ in Equation 26 are chosen to control the aliasing error with scaling $$\bar{e}_j = \sum_{n=1}^{\infty} \bar{g}_j(K_j + 2nl_jK_j)10^{-l_jn}. \quad (28)$$

Since the blocking probabilities involve ratios of normalization constants, it is appropriate to focus on relative errors $e'_j = \bar{e}_j/\bar{g}_j(K_j)$, which can be bounded by $$|e'_j| \leq \sum_{n=1}^{\infty} \left| \frac{\bar{g}_j(K_j + 2nl_jK_j)}{\bar{g}_j(K_j)} \right| 10^{-l_jn}. \quad (29)$$

Let $$C_j = \max_n \left\{ \left| \frac{\bar{g}_j(K_j + 2nl_jK_j)}{\bar{g}_j(K_j)} \right| \right\}^{1/n}$$

$$= \alpha_j^{2l_jK_j} \max_n \left\{ \left| \frac{g_j(K_j + 2nl_jK_j)}{g_j(K_j)} \right| \right\}^{1/n}. \quad (30)$$

-continued

Then $$|e'_j| \leq \sum_{n=1}^{\infty} C_j^n 10^{-l_jn} \leq \frac{C_j 10^{-l_j}}{1 - C_j 10^{-l_j}} \approx C_j 10^{-l_j}. \quad (31)$$

Note that $C_j$ in Equation 30 is independent of $\alpha_{0j}$. The second parameter $\alpha_{0j}$ is used mainly to keep $\bar{g}_j(K_j)$ close to 1, so as to avoid numerical underflow or overflow. (This numerical problem also can be avoided by working with logarithms.)

Hence, the main goal is to choose $\alpha_j$ so that $C_j \ll 10^{l_j}$, where $\ll$ means "much smaller than." Of course, in general $g_j(K_j)$ is not known, so that $C_j$ is not known as well. However, $C_j \ll 10^{\lambda_j}$ can be achieved by roughly controlling the growth rate of $\bar{g}_j(K_j)$, or its fastest growing term, exploiting the structure of the generating function.

For the case of the complete sharing (CS) policy with Poisson arrivals, the scaled generating function is $$\bar{G}(z_1, \ldots, z_p) = \frac{\prod_{i=1}^{p} \alpha_{0i} \exp\left\{ \sum_{j=1}^{r} \rho_j \prod_{i=1}^{p} (\alpha_i z_i)^{b_{ij}} \right\}}{\prod_{i=1}^{p} (1 - \alpha_i z_i)} \quad (32)$$

and the scaled normalization constant is $$\bar{g}(K) = \prod_{i=1}^{p} (\alpha_{0i} \alpha_i^{K_i}) g(K). \quad (33)$$

In this setting, an effective scaling is obtained by choosing the scaling parameters $\alpha_i$, $1 \leq i \leq p$, so that they satisfy the inequalities $0 < \alpha_i \leq 1$ and $$\sum_{j=1}^{r} \rho_j \prod_{k=1}^{p} \alpha_k^{b_{kj}} \prod_{k=1}^{i-1} r_k^{b_{kj}} b_{ij} \leq K_i, 1 \leq i \leq p, \quad (34)$$

where $r_k = 10^{-\alpha_j}$ for $a_j = \lambda_j/(2l_jK_j)$. Once the scaling variables $\alpha_i$ have been obtained, the variables $\alpha_{0i}$ are obtained recursively starting with i=p by $$\prod_{k=i}^{p} \alpha_{0k} = \exp\left\{ -\sum_{j=1}^{r} \rho_j \prod_{k=1}^{p} \alpha_k^{b_{kj}} \prod_{k=1}^{i-1} r_k^{b_{kj}} \right\}. \quad (35)$$

A maximal vector $(\alpha_1, \ldots, \alpha_p)$ satisfying Equation 34 is found by starting with i=p and successively decreasing i. Use the fact that the left side of Equation 34 is monotone in $\alpha_i$. When i=1, the values of $\alpha_i$ for $i \geq l+1$ are known. Approximate by acting as if $\alpha_i=1$ for $i \leq l-1$ and find $\alpha_l$ satisfying the constraint for i=1 in Equation 34. This yields a maximal vector, i.e., if any $\alpha_i$ is less than 1, then at least one constraint in Equation 34 is necessarily satisfied as an equality. Hence, the vector cannot be increased without violating a constraint. However, in general there may be many maximal vectors.

Now the scaling for other arrival-rate and service-rate functions will be described. Only the one-dimensional case will be described in detail. The multidimensional extensions parallel Equations 34 and 35 above.

First, consider the case in which $\lambda_j(k) = \alpha_j + k\beta_j$ for $\beta_j \neq 0$ and $\mu_j(k) = k\mu_j$. (The complete sharing policy is still assumed at this point.) In the one-dimensional case, $$(1-z)G(z) = \prod_{j=1}^{r} (1-(\beta_j/\mu_j)z^{b_j})^{-r_j} \quad (36)$$

$$= \prod_{j=1}^{r} \exp(-r_j \ln(1-(\beta_j/\mu_j)z^{b_j}))$$

$$= \prod_{j=1}^{r} \exp\left(\sum_{l=1}^{\infty} (\beta_j/\eta_j)^l (r_j/l)z^{lb_j}\right)$$

$$= \prod_{j=1}^{r} \prod_{l=1}^{\infty} \exp(((\beta_j/\mu_j)^l(r_j/l)z^{lb_j}).$$

From Equation 36, it follows that this case can be regarded as the Poisson case with infinitely many classes. The classes are indexed as (j,l) where $1 \leq j \leq r$ and $1 \leq l \leq \infty$. The traffic intensity parameter for class (j,l) is $(\beta_j/\mu_j)^l(r_j/l)$ and the resource units needed by a member of this class in $lb_j$. Therefore the same scaling can be used as in the Poisson case.

The one-dimensional version of Equation 34 becomes $$\sum_{j=1}^{r} \frac{r_j(\beta_j/\mu_j)\alpha^{b_j}b_j}{1-(\beta_j/\mu_j)\alpha^{b_j}} \leq K. \quad (37)$$

Thus, $\alpha$ is the largest number in (0, 1] satisfying Equation 37. When solving Equation 37, the left side should be taken as infinity if any of the denominator terms are negative.

Next $$\alpha_0 = \exp\left(-\sum_{j=1}^{r}\sum_{l=1}^{\infty}(\beta_j/\mu_j)^l(r_j/l)\alpha^{lb_j}\right) \quad (38)$$

and, after simplification, $$\alpha_0 = \prod_{j=1}^{r} (1-(\beta_j/\eta_j)\alpha^{b_j})^{r_j}. \quad (39)$$

Next consider the case with $\lambda_j(k)=\lambda_j$ and $\mu_j(k)=\mu_j$. This corresponds to a buffered model with a single server, as in F. Kamoun and L. Kleinrock "Analysis of Shared Finite Storage in a Computer Network Node Environment Under General Traffic Conditions", *IEEE Transactions on Communications*, volume COM-28, pages 992–1003, 1980. This case can be reduced to the case just considered by replacing $r_j$ by 1 and $(\beta_j/\mu_j)$ by $\rho_j$. That yields the scaling parameters. Specifically, $\alpha$ is the maximal solution in the range (0, 1] of the equation $$\sum_{j=1}^{r} \frac{\rho_j \alpha^{b_j} b_j}{1-\rho_j \alpha^{b_j}} \leq K. \quad (40)$$

As before, if $1-\rho_j\alpha^{b_j}<0$ for some j, the entire left hand side is to be interpreted as infinity. Then $$\alpha_0 = \prod_{j=1}^{r} (1-\rho_j\alpha^{b_j}). \quad (41)$$

So far, the complete-sharing (CS) policy has been assumed. In the UL case, the form of the generating function is the same as a CS generating function with more resources. In this case, the CS scaling can be extended in a straightforward way. The GM case can be treated heuristically (only for scaling) by equating it to a UL policy with the upper limits equal to the capacities minus the sum of the guaranteed minima of all other classes. For the combined UL and GM case, as an approximation, use new upper limits, which for each class are the minimum of the given upper limit and the heuristic one based on the guaranteed minima of all other classes.

There is another heuristic that applies to generating functions of any form, and thus is applicable to the general state-dependent arrival and service rates. Let, $$G(z) = (1-z)^{-1} \prod_{j=1}^{r} G_j(z) \quad (42)$$

with $$G_j(z) = \sum_{n_j=0}^{\infty} f_j(n_j) (z^{b_j})^{r_j}. \quad (43)$$

Then a is the largest number in the interval (0, 1] such that $$\sum_{j=1}^{r} \frac{zG_j'(z)}{G_j(z)}\Big|_{z=\alpha} \leq K \quad (44)$$

where $$G_j'(z) = \frac{d}{dz} G_j(z),$$

i.e., the derivative.
Then $$\alpha_0^{-1} = \prod_{j=1}^{r} G_j(\alpha). \quad (45)$$

This scaling agrees with the previous scalings in the special cases treated in detail.

The p-dimensional extension of Equation 42 is $$G(z) = \prod_{i=1}^{p} (1-z_i)^{-1} \prod_{j=1}^{r} G_j(z), \quad (46)$$

where, $$G_j(z) = \sum_{n_j=0}^{\infty} f_j(n_j) \prod_{i=1}^{p} z_i^{b_{ij}r_j}. \quad (47)$$

It is assumed that the innermost level of inversion is with respect to $z_1$ and outermost level of inversion is with respect to $z_p$. Let the scaling parameters be $\alpha=(\alpha_1, \alpha_2, \ldots, \alpha_p)$ and $\alpha_0=(\alpha_{01}, \alpha_{02}, \ldots, \alpha_{0p})$. Then the scale vector $\alpha$ should be a maximal vector satisfying $0<\alpha_i\leq 1$ for $i=1,2,\ldots,p$ and $$\sum_{j=1}^{r}\left(\prod_{k=1}^{i-1} r_j^{kj}\right) z_i \frac{\partial}{\partial z_i} \ln G_j(z)|_{z=\alpha} \leq K_i \quad (48)$$

for $i=1,2,\ldots p$, where $$r_k = 10^{-\lambda_k/2\mu_k K_k}. \quad (49)$$

By "maximal" is meant that Equation 48 should be satisfied with equality for at least one i unless $\alpha=(1,1,\ldots,1)$. The remaining scale parameters $\alpha_{0i}$, $1\leq i\leq p$, are obtained recursively starting with i=p by $$\prod_{k=i}^{p} \alpha_{0k} = \left[\prod_{j=1}^{r} G_j(\alpha_1r_1, \alpha_2r_2, \ldots, \alpha_{i-1}r_{i-1}, \alpha_i, \alpha_{i+1}, \ldots, \alpha_p)\right]^{-1}. \quad (50)$$

Turning now to several techniques that can advantageously be used as options in connection with the present invention, it is to be noted first that if two or more classes have the same parameters (traffic parameters, resource requirements, UL and GM parameters), then this multiplicity can be exploited to significantly reduce the required computation.

Let $\bar{r}$ be the number of different types of customers, and let the $j^{th}$ type have multiplicity $m_j$. Then the total number of customer classes is $$r = \sum_{j=1}^{\bar{r}} m_j. \tag{51}$$

If the p-dimensional generating function of interest can be written as $$G(z) = \prod_{i=1}^{p} (1-z_i)^{-1} \prod_{j=1}^{r} G_j(z), \tag{52}$$

then it can be rewritten as $$G(z) = \prod_{i=1}^{p} (1-z_i) \prod_{j=1}^{\bar{r}} G_j(z)^{m_j}. \tag{53}$$

The computational complexity in evaluating Equation 52 is O(r), while the computational complexity in evaluating Equation 53 is O($\bar{r}$).

Second, as can be seen from Equation 23, the inversion formula in each dimension is a sum of $2l_iK_i$ terms. If $K_i$ is large, there are ways to accelerate convergence of the finite sum including judicious truncation of the finite sum.

The inversion formula in each dimension is a weighted sum of generating function values evaluated over equidistant points along the circumference of a circle. The weights are complex numbers, but they have constant amplitude. As the capacities $K_i$ grow, the amplitude of the generating function typically becomes unevenly distributed along the circumference of the circle. There are several local maximum points and the amplitude drops sharply away from these points. (Since the weights have constant amplitude, it is only necessary to consider the relative amplitude of the generating function values.) If all the relative maximum points can be identified, and then only those points around them that have non-negligible relative amplitude are considered, it is possible to obtain a significant reduction in computation.

First, the truncation procedure is developed for a single resource and then it is extended. Consider the scaled generating function in the case of complete sharing with Poisson arrivals, i.e., $$\bar{G}(z) = \alpha_0 \exp(\rho \alpha^b z^b)/(1-\alpha z). \tag{54}$$

In the outer dimension the computation can be cut in half; thus consider the sum over the upper semicircle with radius $r_1 = 10^{-\lambda_1/2l_1K_1}$.

At a summation point, $z_1 = r_1 e^{i\theta}$ where $\theta$ assumes the values $\pi k/(l_1K_1)$ for $0 \leq k \leq l_1K_1$. Let $\bar{G}^*(\theta)$ be $\bar{G}(z_1)$ expressed as a function of $\theta$, i.e., $$\bar{G}^*(\theta) = \frac{\alpha_{01} \prod_{j=1}^{r} \exp(\rho_j \alpha_1^{b_j} r_1^{b_j} e^{i b_j \theta})}{1 - \alpha_1 r_1 e^{i\theta}}. \tag{55}$$

Note that the amplitude of $\bar{G}^*(\theta)$ in Equation 55 is $$|\bar{G}^*(\theta)| = \frac{\alpha_{01} \prod_{j=1}^{r} \exp(\rho_j (\alpha_1 r_1)^{b_j} \cos(b_j \theta))}{\sqrt{1 + \alpha_1^2 r_1^2 - 2\alpha_1 r_1 \cos\theta}}. \tag{56}$$

For $j=1,2,\ldots,r$, the numerator has relative maxima at $\theta = 2l_j\pi/b_j$ for $l_j = 0,1,\ldots,\lfloor b_j/2 \rfloor$. The denominator has a single minimum at $\theta = 0$. Hence, $|\bar{G}^*(\theta)|$ has a global maximum at $\theta = 0$ and potential local maxima at $\theta = 2l_j\pi/b_j$ for $l_j = 1,2,\ldots,\lfloor b_j/2 \rfloor$ and $j = 1,2,\ldots,r$. Note that usually many of these $$\sum_{j=1}^{r} \lfloor b_j/2 \rfloor$$

local maxima will coincide.

In summary, start by computing $|\bar{G}^*(0)|$ and then find the distinct local maximum points $\theta = 2l_j\pi/b_j$ for $l_j = 1,\ldots,\lfloor b_j/2 \rfloor$ and $j = 1,\ldots,r$, and sort them in increasing order. Let these points be $\theta_m^i$ for $i=1,2,\ldots,L$. In general $\theta_m^i$ may not coincide with a summation point in the inversion algorithm. In that case, move $\theta_m^i$ to the nearest summation point used in the inversion algorithm. Next find all i such that $|\bar{G}^*(\theta_m^i)/\bar{G}^*(0)| \geq \epsilon$, where $\epsilon$ is some allowable error. Then $$|\bar{G}^*(\theta)/\bar{G}^*(0)| = \tag{57}$$

$$\exp\left( - \sum_{j=1}^{r} \rho_j(\alpha_1 r_1)^{b_j}(1 - \cos b_j\theta) \right) \frac{1 - \alpha_1 r_1}{\sqrt{1 + \alpha_1^2 r_1^2 - 2\alpha_1 r_1 \cos\theta}}.$$

For all these i, sum over all summation points in the inversion algorithm above and below $\theta_m^i$ until $|\bar{G}^*(\theta)/\bar{G}^*(0)| \geq \epsilon$. Do not sum over any summation point more than once.

For large $\rho_j$ and $K_1$, typically only the points around $\theta = 0$ and a few other local maxima will be significant. How much computational savings will result can be seen by computing for all values of $\theta$ in $(0, \pi)$ and finding the proportion of the range for which $|\bar{G}^*(\theta)/\bar{G}^*(0)| > \epsilon$. The savings has been shown to be approximately proportional to $\sqrt{K_1}$.

Truncation can also be exploited with multiple resources, but the situation is more complicated. Now the scaled generating function is given by $$\bar{G}(z_1,\ldots,z_p) = \frac{\prod_{i=1}^{p} \alpha_{0i} \exp\left( \sum_{j=1}^{r} \rho_j \prod_{i=1}^{p} (\alpha_i z_i)^{b_{ij}} \right)}{\prod_{i=1}^{p} (1 - \alpha_i z_i)} \tag{58}$$

and the scaled normalization constant is $$\bar{g}(K) = \prod_{i=1}^{p} (\alpha_{0i}\alpha_i^{K_i}) g(K). \tag{59}$$

For inversion with respect to $z_p$, the same computational saving as for a single resource can be achieved, but there are two differences: First, the inversion formula involves summation over the entire circle instead of just a semicircle, so that it is necessary to consider more maximum points. Second, the constant $\rho_j \alpha_1^{b_j}$ in Equation 55 has to be replaced by the constant $$\rho_j \prod_{1=1}^{p} \alpha_i^{b_{ij}} \prod_{1=1}^{p-1} z_i^{b_{ij}}.$$

Since the latter constant is a complex number, it will introduce a constant phase change to $\theta$ and hence to all maximum points.

For inversion with respect to $z_i$ for $i < p$, it is necessary to cope with the partially inverted generating function $g^{(j-1)}(z_{j-1}, K_j)$ for which the functional form is not known. Hence, the maximum points are not known, so that it is necessary to resort to heuristics. Assuming that the location of the maximum points is the same as if the partially inverted generating function has the same functional form as in Equation 55 usually works and gives good computational savings.

In order to compute the blocking probability for each of the r classes in step 706 and 707 of FIG. 7, the computational complexity is $O(r^2)$, because r+1 normalization constant values have to be calculated in step 702 and the computation required for each is $O(r)$. However, for large capacity vectors K it is possible to compute the r+1 normalization constants simultaneously with the bulk of the computations shared, so that the required computation for all normalization constants is only slightly more than for one. This reduces the overall computational complexity from $O(r^2)$ to $O(r)$.

To explain the method, consider a single resource with Poisson arrivals and the complete sharing policy. The blocking probability for class j is $B_j=1-g(K_1-b_j)/g(K_1)$. Then, letting $b_0\equiv$, it is necessary to compute $g(K_1-b_j)$ for $0\leq j\leq r$. Combining the scaling and inversion procedures already described, the standard formula for this computation is $$g(K_1 - b_j) = \frac{\alpha_{0_{1j}}^{-1}\alpha_{1j}^{-(K_1-b_j)}}{m_{1j}r_{1j}^{K_1-b_j}} \sum_{k=-\frac{m_{1j}}{2}}^{\frac{m_{1j}}{2}-1} \alpha_{01j}G(\alpha_{1j}r_{1j}e^{\frac{2\pi ik}{m_{1j}}})e^{-\frac{2\pi ik(K_1-b_j)}{m_{1j}}}, \quad (60)$$

where $\alpha_{01j}$ and $\alpha_{1j}$ are the scaling parameters, $$m_{1j}=2l_1(K_1-b_j) \text{ and } r_{1j}=10^{-\lambda_1/m_{1j}}. \quad (61)$$

The associated aliasing errors are $$e_{1j} = \sum_{n=1}^{\infty} \alpha_{01j}\alpha_{1j}^{K_1-b_j}g(K_1-b_j+nm_{1j})10^{-rn}. \quad (62)$$

Note that the computation in Equation 60 for different values of j cannot be shared because the quantities $\alpha_{01j}$, $\alpha_{1j}$ and $m_{1j}$ are different for different values of j.

In order to share computation for different values of j, for $K_1 \gg b_j$ $(0\leq j\leq r)$, replace the quantities $\alpha_{01j}$, $\alpha_{1j}$ and $m_{1j}$ by their values at j=0 for all j. This should not cause any appreciable difference in the error expression in Equation 60 since for $K_1 \gg b_j$ the quantities $\alpha_{01j}$, $\alpha_{1j}$ and $m_{1j}$ are pretty close to their values at j=0 anyway.

Dropping the subscript j for $\alpha_{01j}$, $\alpha_{1j}$ and $m_{1j}$, Equation 60 can be rewritten as $$g(K_1 - b_j) = \frac{1}{m_1\alpha_{01}(\alpha_1 r_1)^{K_1-b_j}} \sum_{k=-m_1/2}^{m_1/2} T_k C_j^k, \quad (63)$$

where $$C_j = e^{\frac{2\pi ib_j}{m_1}} \text{ and } T_k = \alpha_{01}G(\alpha_1 r_1 e^{\frac{2\pi ik}{m_1}})e^{-\frac{2\pi ikK_1}{m_1}}. \quad (64)$$

Note that the bulk of the computation in Equation 63 is computing $T_k$, which can be shared. The quantities $C_j^k$ can be computed quickly, since $C_j$ needs to be computed only once for each j. It is also clear that by working with partial sums for all j simultaneously, the overall computation may be done with a storage requirement $O(r)$. Moreover, if truncation (described above) applies, then it applies uniformly for all j, since $|C_j^k|=1$. For multiple resources and other sharing policies, the same approach works.

We now turn to a discussion of computing the blocking probabilities. The blocking probabilities are obtained as relatively simple expressions of the normalization constants, so that the main work is computing the normalization constants, which has been described above. Nevertheless, some care is needed in computing the blocking probabilities. It is important to distinguish between "call blocking" and "time blocking". "Call blocking" refers to the blocking experienced by arrivals (which depends on the state at arrival epochs), while "time blocking" refers to the blocking that would take place at an arbitrary time if there were an arrival at that time. Since the steady-state distribution $\pi$ in Equation 10 refers to an arbitrary time, blocking probabilities computed directly from it involve time blocking, but it is possible to calculate call blocking as well as time blocking. With Poisson arrivals, the two probability distributions at arrival epochs and at an arbitrary time agree, but not more generally.

First, when we obtain a BPP state-dependent arrival process as an approximation to an arrival process partially specified by rate and peakedness, then (as discussed in the treatment of peakedness above) it is usually better to compute the call blocking probability using Equation 9 instead of computing the exact BPP call blocking. Hence, the discussion about call blocking below is intended for the case in which the state-dependent arrival process arises in the model naturally (as opposed to an approximate representation of peakedness). An important example is the case of finite-source input.

With the complete-sharing policy, the probability that a customer-j request would not be admitted at an arbitrary time (time blocking) is $$B_j^t = 1 - \frac{g(K-b_j)}{g(K)}, \quad (65)$$

where $b_j\equiv(b_{1j},\ldots,b_{pj})$ is the requirements vector for class j.

As noted above, if customer-j requests arrive in a Poisson process, then Equation 65 also yields the call blocking, but not more generally. However, if the arrival rate is state-dependent, then the call blocking always can be obtained by calculating the time blocking in a modified model. Let $B_j$ be the customer-j blocking probability (call blocking). Let $B\equiv(b_{ij})$ be the requirements matrix. In general, $$B_j = 1 - \frac{\sum_{n:Bn\leq K-b_j} \lambda_j(n_j)\pi(n)}{\sum_{n:Bn\leq K} \lambda_j(n_j)\pi(n)} \quad (66)$$

$$= 1 - \frac{\sum_{n:Bn\leq K-b_j} \lambda_j(n_j)f(n)}{\sum_{n:Bn\leq K} \lambda_j(n_j)f(n)}.$$

However, $\lambda_j(n_j)$ f(n) can be rewritten as $\lambda_j(0)\bar{f}(n)$ and thus Equation 65 can be rewritten as $$B_j = 1 - \frac{\sum_{n:Bn\leq K-b_j} \bar{f}(n)}{\sum_{n:Bn\leq K} \bar{f}(n)} = 1 - \frac{\bar{g}(K-b_j)}{\bar{g}(K)}, \quad (67)$$

where $\bar{f}(n)$ is the analog of f(n) with $\lambda_j(m)$ replaced by $\bar{\lambda}_j(m)\equiv\lambda_j(m+1)$, and $\bar{g}(k)$ is the analog of g(k) with f(n) replaced by $\bar{f}(n)$. Thus, the customer-j blocking probabilities $B_j$ in Equation 67 coincide with the time-blocking quantities $B_j^t$ in Equation 65 for the modified model in which the class-j arrival-rate function is changed from $\lambda_j(m)$ to $\bar{\lambda}_j(m)\equiv\lambda_j(m+1)$.

For the special case in which $\lambda_j(m)=\alpha_j+\beta_j m$, $$\bar{\lambda}_j(m)=\lambda_j(m+1)=\alpha_j+\beta_j(m+1)=(\alpha_j+\beta_j)+\beta_j m, \quad (68)$$

so that the modified model is a model of the same general form. For the model with linear arrival-rate function, this approach to computing call blocking was pointed out by Z. Dziong and J. W. Roberts, in "Congestion Probabilities in a Circuit-Switched Integrated Services Network", *Performance Evaluations*, volume 7, pages 267–284, 1987, at page 273.

Different expressions are needed for the model with UL and GM bounds. Paralleling Equation 65, the time blocking with the UL and GM bounds is $$B_j^t = 1 - \frac{g(K - Be_j, U - e_j, N - Be_j)}{g(K, U, N)} . \quad (69)$$

where $g(K,U,N)$ is the normalization constant. The call blocking is again the time blocking $B_j^t$ with modified parameters.

We now return to other key steps in the blocking probability computer, depicted in FIG. 7. As indicated in FIG. 7, step 702 of the blocking probability computer process is to apply the normal-approximation algorithm to identify and eliminate very lightly loaded resources from the resource model. This step is done before performing the inversion in step 707 to make the inversion less difficult.

Figure 8:
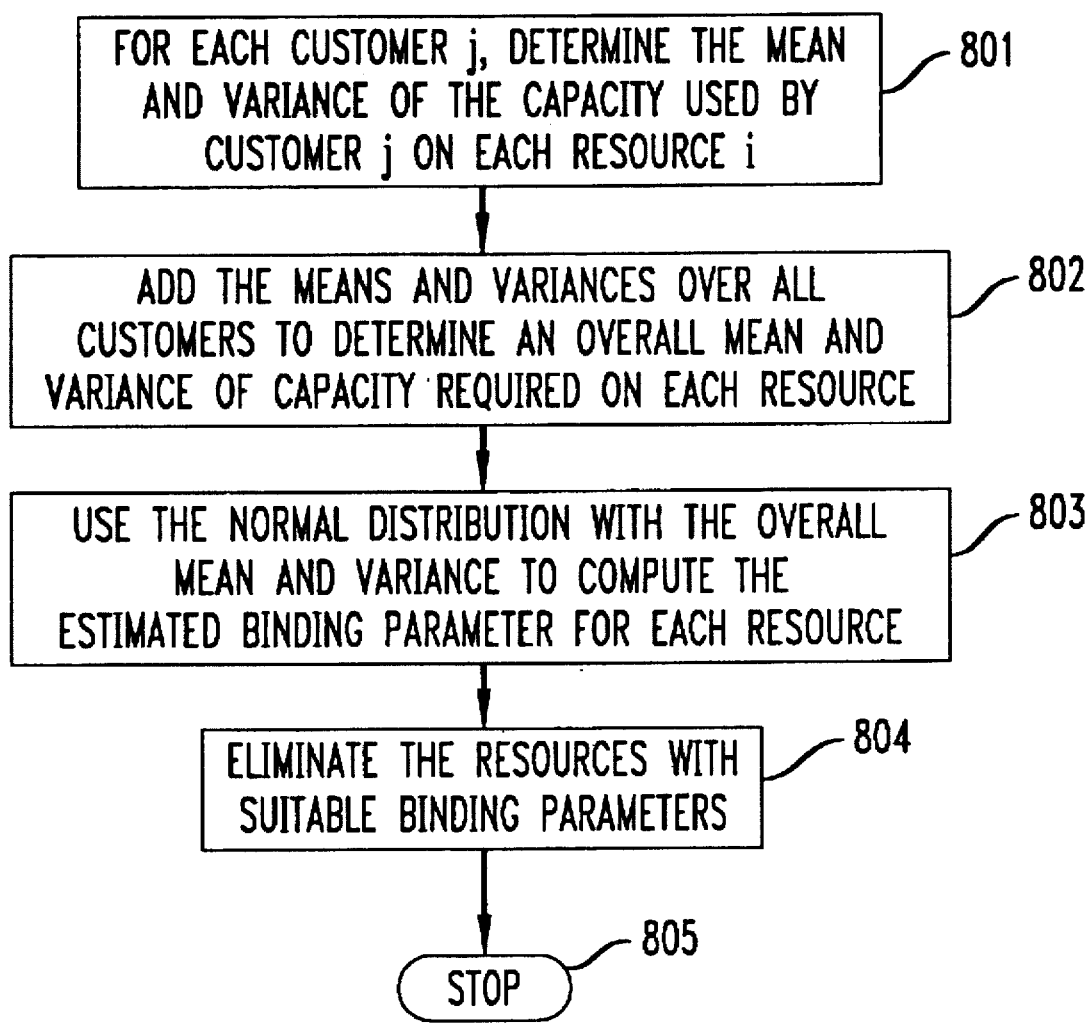
FIG. 8 is a flow diagram illustrating the process in accordance with the present invention for identifying lightly loaded resources using a normal-approximation technique.

The details of the normal approximation method are illustrated in FIG. 8. First, in step 801 the mean and variance of the capacity used by each customer on each resource is determined. For further discussion, let the resource and the customer be fixed, and omit the i and j subscripts.

It is assumed that the arrival-rate function is linear, i.e., $\lambda(k) = \alpha + k\beta$. As indicated above, this includes the standard case of Poisson arrivals and the case in which there is a peakedness parameter. If there were no capacity constraints, then the mean and variance of the number of requests in service would be $$m = \frac{\alpha}{\mu - \beta} \text{ and } v = \frac{\mu\alpha}{(\mu - \beta)^2} . \quad (70)$$

Since each request uses b resource units, the associated mean and variance of the number of resource units used are $$\bar{m} = mb \text{ and } \bar{v} = vb^2 \quad (71)$$

for m and v in Equation 70.

However, it remains to take account of the UL bound U and the GM bound L. For this purpose, a conditional normal approximation is used. The idea is to act as if the number of active requests at any time is a normally distributed random variable with mean m and variance v in Equation 70, but conditional on never being above U. This is denoted by $\bar{N} \equiv (N(m,v) | N(m,v) \leq U)$.

Let the capacity (number of resource units) used be denoted by $C(L,U)$. Note that $C(L,U)$ is $bL$ when $\bar{N} \leq L$, and is $b\bar{N}$ otherwise. Hence, using properties of the normal distribution, the mean and variance of $C(L,U)$ can be calculated. For this purpose, let $\phi(x)$ be the standard (mean 0, variance 1) normal density function and let $\Phi(x)$ be its cumulative distribution function.

Assuming that the occupancy for a customer can be approximated by the conditional normal variable $(N(m,\sigma^2) | N(m,\sigma^2) \leq U)$, the first two moments of the capacity used at any time are $$EC(L, U) = bLP(N(m, \sigma^2) \leq L | N(m, \sigma^2) \leq U) + \quad (72)$$

$$bE(N(m, \sigma^2) | L \leq N(m, \sigma^2) \leq U) P(L \leq N(m, \sigma^2) | N(m, \sigma^2) \leq U) =$$

$$bL \frac{\Phi((L - m)/\sigma)}{\Phi((U - m)/\sigma)} + bX \left( \frac{\Phi((U - m)/\sigma) - \Phi((L - m)/\sigma)}{\Phi((U - m)/\sigma)} \right),$$

-continued where $$X \equiv m + \sigma \frac{\phi((L - m)/\sigma) - \phi((U - m)/\sigma)}{\Phi((U - m)/\sigma) - \Phi((L - m)/\sigma)} \quad (73)$$

and $$E[C(L, U)^2] = b^2L^2 P(N(m, \sigma^2) \leq L | N(m, \sigma^2) \leq U) + \quad (74)$$

$$b^2 E[N(m, \sigma^2)^2 | L \leq N(m, \sigma^2) \leq U] P(L \leq N(m, \sigma^2) | N(m, \sigma^2) \leq U) =$$

$$b^2L^2 \frac{\Phi((L - m)/\sigma)}{\Phi((U - m)/\sigma)} + b^2Y \left\{ \frac{\Phi((U - m)/\sigma) - \Phi((L - m)/\sigma)}{\Phi((U - m)/\sigma)} \right\},$$

where $$Y = m^2 + \sigma^2 + 2m\sigma \left( \frac{\phi((L - m)/\sigma) - \phi((U - m)/\sigma)}{\Phi((U - m)/\sigma) - \Phi((L - m)/\sigma)} \right) + \quad (75)$$

$$\sigma \left( \frac{(L - m)\phi((L - m)/\sigma) - (U - m)\phi((U - m)/\sigma)}{\Phi((U - m)/\sigma) - \Phi((L - m)/\sigma)} \right).$$

As usual, the variance is $$\text{Var } C(L,U) = E[C(L,U)^2] - E[C(L,U)]^2. \quad (76)$$

If, in addition, $\Phi((U-m)/\sigma) \approx 1$ and $\phi((U-m)/\sigma) \approx 0$, then $$EC(L,U) \approx bm - b(m - L)\Phi((L-m)/\sigma) + b\sigma\phi((L-m)/\sigma) \quad (77)$$

and $$E[C(L, U)^2] \approx \quad (78)$$

$$b^2L^2\Phi((L - m)/\sigma) + b^2(m^2 + \sigma^2)\Phi^c((L - m)/\sigma) +$$

$$b^2[2m\sigma + (L - m)]\phi((L - m)/\sigma).$$

The description so far has shown how to estimate the mean and variance of the resource units used by a given customer. For many customers, let $M_j$ and $V_j$ denote the mean and variance of $C(L,U)$ for customer j. The next step, step 802, is to add the means and variances over all customers to find a total mean and variance for all customers, say M and V (for one fixed resource).

The normal approximation is next used in step 803 to estimate the capacity actually needed. In particular, the total capacity needed at any time is regarded as approximately normally distributed, i.e., as $N(M,V)$. If X is the capacity needed, then $(X-M)/\sqrt{V}$ is thus distributed as $N(0,1)$. Thus, it can be determined if the available capacity K on this resource provides a serious constraint.

For this purpose, construct the "binding parameter"

$$\gamma = (K - M)/\sqrt{V} . \quad (79)$$

Note that $$P(X > K) = P(N(0,1) > \lambda). \quad (80)$$

Hence, if the binding parameter $\lambda$ in Equation 79 is suitably large, e.g., when $\lambda \geq 5$, then the capacity K is unlikely to be exceeded.

The calculation just described is done for every resource. All resources that have suitably large binding parameters in Equation 79 are eliminated from the model, in step 804.

As indicated in FIG. 7, step 704 of the blocking probability computer involves applying a conditional decomposition procedure to reduce the effective dimension of the transform. As with the normal-approximation algorithm just discussed, this step is done before performing the inversions in step 707 to make the inversion less difficult. The idea behind conditional decomposition is that it is often possible to reduce the effective dimension of a numerical inversion by exploiting special structure. To understand this concept, note that if G(z) can be written as the product of factors, where no two factors have common variables, then the inversion of G(z) can be carried out by inverting the factors separately, and the dimension of the inversion is reduced to the maximum dimension of any one factor. The factors can be treated separately, because factors not involving the variable of integration pass through the sum in the inversion formula.

However, it virtually never happens that the generating function can be factored into separate components with no common variables, because this corresponds to having two unrelated problems. The idea is to look for a weaker property, called "conditional decomposition". First, select d variables that will be inverted and see if the remaining function of p–d variables can be expressed as a product of factors with no two factors containing any common variables from these p–d remaining variables. The maximum dimension of the inversion is then d plus the maximum number of the p–d variables appearing in any one factor, say m. The overall inversion can then be regarded as being of dimension d+m. The idea is to select an appropriate d variables, so that the resulting dimension d+m is small. In small problems, this can be done by enumeration.

It is significant that conditional decomposition can always be systematically exploited for UL and GM policies to drastically reduce the effective dimension. Consider the generating function displayed in Equation 14. The generating function there is directly expressed in terms of factors. Since the factor $G_j(z,y,x)$ in Equation 15 contains only the variables $z$, $y_j$ and $x_j$, the effective dimension in Equation 14 can always be reduced from p+2r to p+2. However, it is possible to do even better by explicit inversion. Explicit inversion with respect to $x_j$ yields $$G_j(z, y_j, N_j) = (1 - y_j)^{-1} \left[ \left( \prod_{i=1}^{p} z_i^{\delta_{ij}} \right)^{N_j} \sum_{n_j=0}^{\lfloor N_j/b_j \rfloor} f_j(n_j) y_j^{n_j} + \sum_{n_j=\lfloor N_j/b_j \rfloor+1}^{\infty} f_j(n_j) \left( y_j \prod_{i=1}^{p} z_i^{\delta_{ij}} \right)^{n_j} \right]. \quad (81)$$

Now doing explicit inversion of Equation 81 with respect to $y_j$ and remembering that $U_j \geq \lfloor N_j/b_j \rfloor$ yields $$G_j(z, U_j, N_j) = \left( \prod_{i=1}^{p} z_i^{\delta_{ij}} \right)^{N_j} \sum_{n_j=0}^{\lfloor N_j/b_j \rfloor} f_j(n_j) + \sum_{n_j=\lfloor N_j/b_j \rfloor+1}^{U_j} f_j(n_j) \left( \prod_{i=1}^{p} z_i^{\delta_{ij}} \right)^{n_j b_j}. \quad (82)$$

Note the remarkably simple form of Equation 82. Assuming $N_j$ to be an integral multiple of $b_j$, rewrite Equation 82 as $$G_j(z, U_j, N_j) = \left( \prod_{i=1}^{p} z_i^{\delta_{ij}} \right)^{N_j} \times \quad (83)$$

$$\left[ \sum_{l=0}^{N_j/b_j} f_j(l) + \sum_{l=1}^{U_j - N_j/b_j} f_j( N_j/b_j + l ) \left( \prod_{i=1}^{p} z_i^{\delta_{ij}} \right)^{lb_j} \right].$$

The overall remaining generating function is $$G(z, U, N) = \prod_{i=1}^{p} (1 - z_i)^{-1} \prod_{j=1}^{r} G_j(z, U_j, N_j), \quad (84)$$

where $G_j(z,U_j,N_j)$ is given by Equation 81 or Equation 82. If Equation 82 is used, then there is a leading term $$\prod_{i=1}^{p} z_i^{\sum_{j=1}^{r} N_j \delta_{ij}}$$

which can be explicitly taken out, yielding a smaller problem with $K_i$ replaced by $$K_i - \sum_{j=1}^{r} \delta_{ij} N_j$$

for $i=1,2,\ldots,p$. This step will be especially effective if $$K \approx \sum_{j=1}^{r} \delta_{ij} N_j.$$

As an extreme case, if $$K_i = \sum_{j=1}^{r} \delta_{ij} N_j,$$

$1 \leq i \leq p$, then this yields complete partitioning. Then Equations 82 and 83 provide an explicit expression for the normalization constant as $$g(K, U, N) = \prod_{j=1}^{r} \sum_{n_j=0}^{\lfloor N_j/b_j \rfloor} f_j(n_j). \quad (85)$$

Using Equations 84 and 81 or Equation 83, the effective dimension of inversion has been effectively reduced from p+2r to p. However, since there are $U_j$ terms in Equations 82 and 83, the computational complexity is about $U_j$ times that of a closed form p-dimensional inversion. In general, $U_j$ could increase with the $K_i$, but if there are many classes, $U_j$ may remain small even with large $K_i$. If, however, $U_j$ is indeed very large, then it will be advantageous to work with $G_j(z,y_j,N_j)$ and do one more level of inversion. If $\lfloor N_j/b_j \rfloor$ is large, then it may even be advantageous to work with $G_j(z,y_j,x_j)$.

Special cases are easily obtained by inserting the corresponding expressions for $f_j(n_j)$. In case $\lambda_j(k)=\lambda_j$ and $\mu_j(k)=\mu_j$, the sums in Equations 82 and 83 may be expressed in closed form. Specifically, Equation 83 becomes $$G_j(z, M_j, N_j) = \left( \prod_{i=1}^{p} z_i^{\delta_{ij}} \right)^{N_j} \left[ \frac{1 - \rho_j^{N_j/b_j+1}}{1 - \rho_j} + \left( 1 - \rho_j \left( \prod_{i=1}^{p} z_i^{\delta_{ij}} \right)^{b_j} \right)^{-1} \right] \times \left( \rho_j^{N_j/b_j+1} \left( \prod_{i=1}^{p} z_i^{\delta_{ij}} \right)^{b_j} - \rho_j^{U_j+1} \left( \prod_{i=1}^{p} z_i^{\delta_{ij}} \right)^{U_j b_j - N_j + b_j} \right). \quad (86)$$

Thus, in this case the computation for the combined UL and GM model is just as fast as for the simple CS model.

The reduced-load fixed-point approximation performed in step 706 of FIG. 7 is an effective approach for approximately analyzing resource-sharing models or loss networks that are too large to solve exactly. This approach is also important for approximately analyzing systems in which there is alternative routing for blocked requests. In this approach, we act as if the different resources are stochastically independent, and the customer request arrival processes to different resources are mutually independent, but reduce the offered load of each customer at each resources by the blocking experienced by that customer elsewhere. This approximation strategy, together with a process to solve a single resource, leads to a nonlinear system of fixed-point equations for the approximate blocking probabilities of each customer, which can be solved iteratively; see S. P. Chung and K. Ross "Reduced Load Approximations for Multi-Rate Loss Networks", *IEEE Transactions on Communications* volume 41, pages 1222–1231, 1993; F. P. Kelly, "Loss Networks", *Annals of Applied Probability*, volume 1, pages 319–378, 1991; and W. Whitt, "Blocking When Service is Required from Several Facilities Simultaneously", *AT&T Technical Journal*, volume 64, pages 1807–1856, 1985.

This reduced-load fixed-point approximation scheme can be applied to large resource-sharing models with the UL and GM bounds by using the blocking probability computer to calculate the exact blocking probabilities for each customer on each resource. Moreover, it is sometimes possible to improve the quality of these reduced-load fixed-point approximations by exploiting the process of the present invention for exactly solving models with more than one resource. We can then decompose the initial large resource-sharing model into smaller submodels (now typically with more than one resource) which can be efficiently solved exactly. We can also act as if these submodels are independent, and reduce the offered load of each customer at each model by the blocking experienced by that customer in other submodels. (When alternative routing is present, it is not possible to exactly solve submodels with more than one resource using the blocking probability computer. Hence submodels are intended for other applications.)

When more than one resource is used in the submodels, it is necessary to determine which resources should be grouped together in the submodels. For this purpose, we have found that it is advantageous to identify good decompositions for these new reduced-load approximations. We estimate how tightly coupled each pair of resources is by computing the correlations between the resource occupancies in the associated unlimited-capacity model. Unlimited-capacity models have a long tradition in teletraffic theory, e.g., associated with the concept of peakedness and normal approximations; see W. Whitt "Heavy-Traffic Approximations for Service Systems with Blocking", *AT&T Bell Laboratories Technical Journal*, volume 63, pages 689–708, 1984 and Z. Dziong and J. W. Roberts, (cited above). We thus try to put two resources in the same submodel when they are relatively tightly coupled, i.e., are high correlated.

It is assumed that very lightly loaded resources which provide essentially no constraint are already eliminated from the model. Suppose that p resources remain. Partition the p resources into s subsets, indexing the subsets by k. (Each resource appears in one and only one subset.) Let resource (k,i) be the $i^{th}$ resource of subset k. Let $p_k$ be size of the $i^{th}$ subset. Then the resources are indexed by pairs (k,i) for $1 \leq i \leq p_k$ and $1 \leq k \leq s$. The first step in the approximation is to regard the s submodels as stochastically independent. They are solved separately. The initial offered traffic to each submodel is the offered traffic in the original model that uses the submodel. A crude initial approximation for the blocking probability of customer j is $$B_j = 1 - \prod_{k=1}^{s} (1 - B_{kj}), \tag{87}$$

where $B_{kj}$ is the blocking probability for customer j at submodel k, assumed to be based directly on the original model data. Equation 87 exploits the independence approximation, because it arises by assuming that the probability of customer j not being blocked overall is equal to the product of the probabilities of it not being blocked at each submodel.

If the submodel blocking probabilities $B_{kj}$ are relatively small, then Equation 87 itself can be an excellent approximation. Otherwise, it may be much better to reduce the arrival rate at each submodel to take account of the blocking experienced at other submodels. Since in general there are state-dependent arrival rates, new reduced state-dependent arrival-rate functions $\lambda_{kj}^*$ for customer j at submodel k are formed by letting $$\lambda_{kj}^*(m) = \lambda_j(m) \prod_{\substack{l=1 \\ l \neq k}}^{s} (1 - B_{lj}). \tag{88}$$

The reduced arrival-rate function $\lambda_{kj}^*$ depends on the submodel blocking probabilities $B_{lj}$, and the submodel blocking probabilities in turn depend on the arrival-rate functions used in the submodels. Hence, it is necessary to find a fixed-point solution to Equations 87 and 88. Initially let $\lambda_{kj}^*(m) = \lambda_j(m)$. Then solve the submodel to obtain the submodel blocking probabilities $B_{kj}$ and use Equation 87 to obtain the first candidate overall blocking probabilities $B_j$. Then solve Equation 88 to obtain new values of $\lambda_{kj}^*(m)$. Iterate, solving Equations 87 and 88, until there is little change. If necessary, the iteration can be modified to get convergence, e.g., by relaxation methods. For instance, the new value of $\lambda_{kj}^*(m)$ can be a convex combination of the previous value and the candidate new value instead of the candidate new value itself.

The advantage of working with submodels instead of individual resources in the reduced-load approximation is that resources that are tightly coupled can be treated together. It is natural to put resources in the same subset when they are relatively tightly coupled, and to put resources in different subsets when they are relatively weakly coupled.

The key for choosing good decompositions is to obtain a useful estimate of how tightly coupled the resources actually are. A way to do this is to compute the correlations between the steady-state occupancies in an associated infinite-capacity model. The correlation between resources $i_1$ and $i_2$ is $$c(i_1, i_2) = \frac{C(i_1, i_2)}{\sqrt{V(i_1)V(i_2)}}, \tag{89}$$

where V(i) is the variance and $C(i_1,i_2)$ is the covariance. These in turn can be determined from the customer variances and requirements. Let $b_{ij}$ be the number of resource units required by a customer-j request on resource i, and let $v_j$ be the variance of the number of active requests from customer j. Then $$V(i) = \sum_{j=1}^{r} v_j b_{ij}^2 \tag{90}$$

and $$C(i_1, i_2) = \sum_{j=1}^{r} v_j b_{i_1 j} b_{i_2 j}. \tag{91}$$

Ways to compute means and variances for individual classes were described above in connection with the normal-approximation algorithm for eliminating lightly loaded resources. Finally, resources that are most highly correlated are put together in the same submodel.

B. Adjustment of Resource Capacity and Traffic Bounds

In accordance with another aspect of the present invention, the previously described blocking probability computer is used to adjust the capacity of a single resource, and the adjustment of associated UL and GM parameters, in response to changes of expected traffic load. (Similar procedures could be used for multiple resources.) As the traffic demands increase or decrease, the existing resource capacity may become inadequate or excessive, and the UL and GM parameters may also no longer be appropriate. Since the resource is limited, it is desirable to use a minimum number of resource units to meet the new demand. For the new traffic load, the goal is to identify such a minimum feasible resource capacity, along with good UL and GM traffic bounds, for satisfying the specified performance requirements. That is, the optimization problem under consideration is to minimize the resource capacity by choosing appropriate UL and GM parameters, while meeting the blocking probability requirements.

The present invention uses a search procedure to systematically explore various candidate parameter settings and identify the best among them. A major component of the search procedure is the use of the blocking probability computer to determine the blocking probabilities for a given set of parameters. Since the number of control variables may be large and the optimization problem does not have established mathematical properties (e.g., monotonicity and convexity), it is difficult to devise an efficient algorithm for finding the optimal solution. Consequently, a heuristic search is used, employing the blocking probability computer to identify a good feasible resource capacity and good UL and GM parameters for the new traffic load. The specific search technique presented below should be viewed as one of many alternative approaches. Other search procedures can be developed by those skilled in the art, using the blocking probability computer as the key element.

Figure 9:
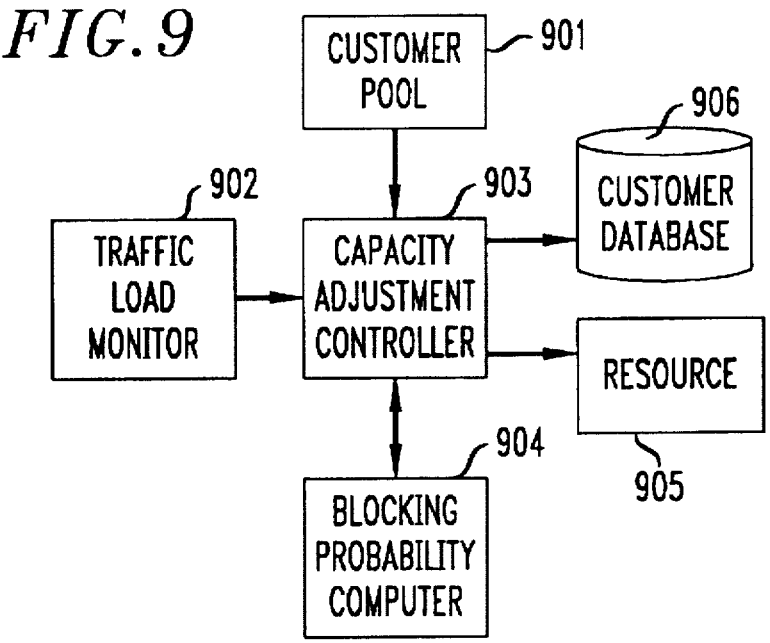
FIG. 9 is a block diagram of a system arranged in accordance with the present invention for making capacity adjustments in a resource-sharing system.

The search procedure can be invoked to adjust the resource capacity and the UL and GM parameters as a real-time response to changes of traffic load. The time scale in the real-time response may vary in different applications. A block diagram of a system arranged in accordance with the present invention for making capacity adjustments in a resource sharing system is shown in FIG. 9. A capacity adjustment controller 903 manages the capacity adjustment process. The capacity adjustment process is triggered by inputs either directly from the customers in a customer pool 901 or from a traffic load monitor 902. Customers can indicate their desire to either increase or decrease their grade of service. Traffic load monitor 902 can indicate that the current capacity needs to be either increased or decreased. When a capacity adjustment is deemed appropriate, capacity adjustment controller 903 performs a search procedure, using blocking probability computer 904 to find an appropriate new resource capacity to meet the new requirements. This may require adjustment of the customer UL and GM bounds as well. When the new capacity and bounds are determined, the change is made in the resource 905, and the new parameters are sent to customer database 906, where they are used for the ongoing management of the system.

Consider a resource serving r customers indexed by 1 to r, where each customer-j request demands $b_j$ units of the resource. It is assumed that all the $b_j$'s have been appropriately scaled by the greatest common denominator of all the $b_j$'s. With this scaling, the largest common factor of all the $b_j$'s is 1. Each customer j has nominal and conditional blocking probability requirements, denoted by $B_j^*$ and $\bar{B}_j^*$ respectively. The nominal requirement $B_j^*$ is specified for the normal traffic load; that is, each customer submits requests to the resource at the pre-specified load level (which has been agreed upon between customers and the system). In contrast, the conditional requirement $\bar{B}_j^*$ is specified for some form of overload conditions. It will be assumed here that the offered load of all customers other than customer j is X percent (e.g., 10%) above the pre-specified load level. Other conditional blocking requirements can be treated in a similar way, but some may lead to more computation.

Let the UL and GM parameters for customer j be denoted by $U_j$ and $L_j$, respectively. These are bounds on the number of requests, not the number of resource units. To guarantee a minimum grade of service in case of extreme overload of all other customers, customer j may have a lower bound $L_j^*$ on its GM parameter, so that at least $L_j^*$ requests of customer j can be served by the system at any time. That is, $L_j \geq L_j^*$. In addition, customer j may have a lower bound $U_j^*$ on its UL parameter, so that $U_j \geq U_j^*$.

Let K be the number of resource units (i.e., the resource capacity). Also let $B_j$ and $\bar{B}_j$ be the nominal and conditional blocking probabilities, respectively. Now, the optimization problem can be formalized as:

Minimize K over K, $U_j$, and $L_j \in \{0\} \cup Z^+$ for given $B_j^*$, $\bar{B}_j^*$, $U_j^*$ and $L_j^*$ such that $B_j \leq B_j^*$, $\bar{B}_j \leq \bar{B}_j^*$, $U_j^* \leq U_j$ and $L_j^* \leq L_j$ for all j=1,2, ..., r.

Figure 10:
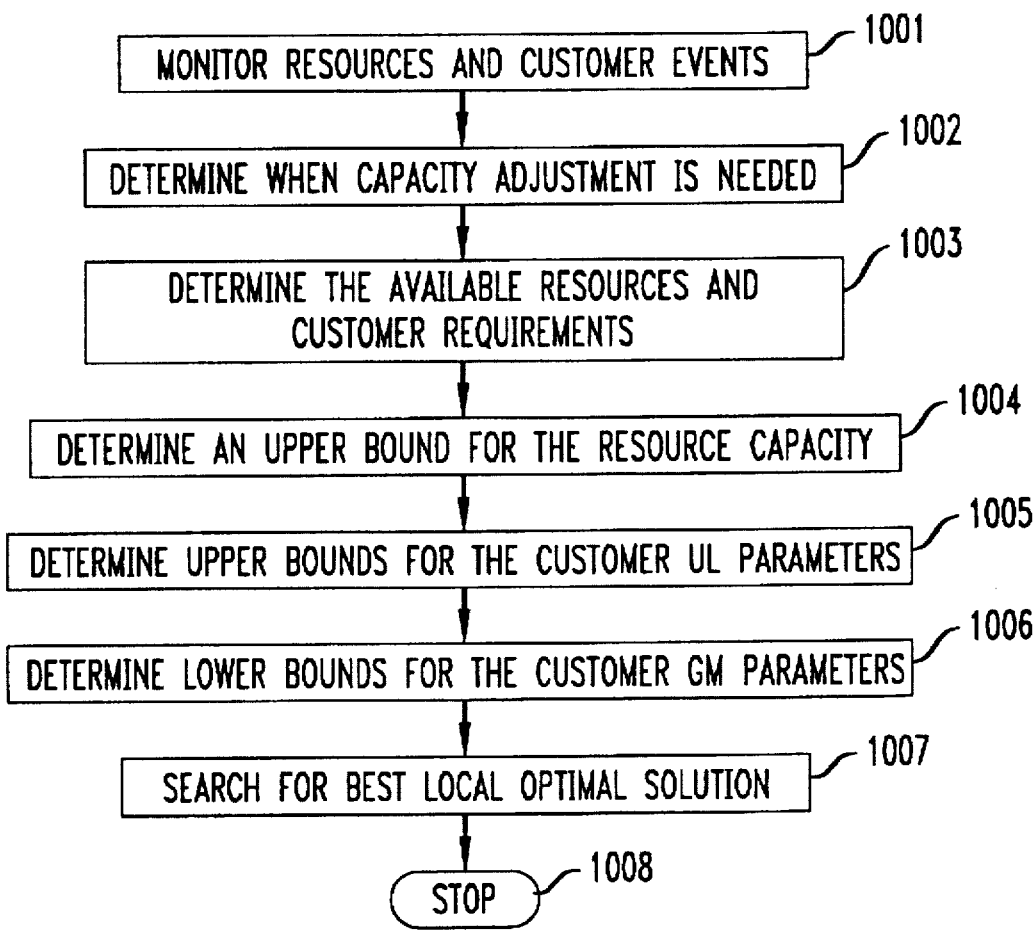
FIG. 10 is a flow diagram illustrating the capacity adjustment process performed in the system of FIG. 9

The capacity adjustment process is outlined in FIG. 10. The process starts by constantly monitoring the resource usage and customer demands in step 1001. The system periodically determines when the resource capacity needs adjustment in step 1002. When adjustment is needed, step 1003 determines the available resources and customer requirements. Based on these data, the search procedure attempts to find a good resource capacity by the following four major steps:

a. Find an upper bound $K_u$ for the resource capacity in step 1004;

b. Find an upper bound $\tilde{U}_j$ for the UL parameter for each customer j in step 1005;

c. Find a lower bound $\tilde{L}_j$ for the GM parameter for each customer j in step 1006; and d. Apply a local search technique to identify the best local optimal solution in step 1007 based on the "pessimistic solution" found in a) to c) above.

These steps are discussed in turn below. In each step, the blocking probability computer is repeatedly invoked to compute the blocking probabilities for the candidate parameter settings.

(1) An Upper Bound $K_u$ for the Resource Capacity

Based on the nominal offered load, the lower bounds $L_j^*$ for the GM parameters, infinite UL parameters and the resource requirements $b_j$ for each customer j, the normal approximation in Equations 72–76 is used to compute the mean and variance, denoted by $M_j$ and $V_j$ respectively, of the number of resource units occupied by each customer j. Let the average and the variance of the number of resource units occupied by all customers be M and V, which are in turn obtained by $M = \Sigma_{j=1}^r M_j$ and $V = \Sigma_{j=1}^r V_j$, respectively.

The upper-bound capacity $K_n$ for the nominal traffic load can be determined by the following steps:

(a) Set a search parameter γ to 4.

(b) Set $K = M + \gamma \sqrt{V}$. Using the nominal offered load, the resource capacity K and the GM parameter $L_j^*$ and an infinite UL parameter for each customer j, invoke the blocking probability computer to compute the blocking probability $B_j$ for each customer j.

(c) If there exists at least one j from 1 to r where $B_j > B_j^*$, increase γ by 1 and continue with step b). Otherwise, set $K^* = M + \gamma \sqrt{V}$ and continue with step d).

(d) Reset $\lambda$ to 1.

(e) Set $K=M+\gamma\sqrt{V}$. Using the nominal offered load, the resource capacity K and the GM parameter $L_j^*$ and an infinite UL parameter for each customer j, invoke the blocking probability computer to compute the blocking probability $B_j$ for each customer j.

(f) If there exists at least one j from 1 to r where $B_j \leq B_j^*$, decrease $\gamma$ by 1 and continue with step e). Otherwise, set $K_*=M+\gamma\sqrt{V}$ and continue with step g).

(g) By repeatedly invoking the blocking probability computer, conduct a bisection search to look for $k_u$ between $K_*$ and $K^*$ such that $B_j \leq B_j^*$ for all j from 1 to r and all $K^* \geq K \geq K_n$, but there exists at least one j from 1 to r that $B_j > B_j^*$ for $K=K_n-1$.

The computation of resource occupancy M and V, and the above steps (a) to (g) are repeated for the conditional (overload) traffic load, to find an upper-bound capacity $K_c$ for the overload condition. For simplicity, this can be done by assuming that all customers have X % overload. Then, it is not necessary to do a separate calculation for each customer. Finally, the upper-bound resource capacity $K_u$ is chosen to be the maximum of $K_n$ and $K_c$.

(2) An Upper Bound for the UL Parameter of Each Customer

The idea here is to find an upper bound $\tilde{U}_j$ for the UL parameter $U_j$ for each customer j based on the assumption that the resource has the upper-bound capacity $K_u$ obtained above. These upper bounds are determined first by considering the nominal offered load and the nominal blocking probability requirements. Then, the same procedure is repeated for the overload and conditional blocking probability requirements. The final upper bound $\tilde{U}_j$ for customer j is set to be the maximum of the bounds for the nominal and overload condition, and the lower bound $U_j^*$ pre-specified by the customers.

The upper bounds for the UL parameters at the nominal traffic condition can be determined by the following steps:

(a) Based on the nominal offered load, the upper bound $K_u$ for the capacity, the lower bounds $L_j^*$ for the GM parameter, UL parameters equal to $K_u$ and the resource requirements $b_j$ for all customers j, invoke the blocking probability computer to determine the blocking probabilities for all customers. These computed blocking probabilities are referred to as the referenced blocking probabilities in the following description.

(b) Assume that the GM and UL parameters for each customer j are $L_j^*$ and $K_u$, respectively. By (70), compute the average $m_j$ and the variance $v_j$ of the number of requests in service from each customer j.

(c) Define a set C to be $\{1,2,\ldots,r\}$. Set $\gamma$ to an upper-bound value (e.g., 6). This upper-bound value can be verified by using the blocking probability computer to make sure that the blocking probability for customer j is less than or equal to Y % (e.g., 10%) of the blocking probability requirement plus the referenced blocking probability for all customers j from 1 to r.

(d) For each $j \in C$, set $\tilde{U}_j = \text{minimum}(m_j+\gamma\sqrt{v_j}, K_u)$ (e) Using the resource capacity $K_u$, and the GM and UL parameters $L_j^*$; and $\tilde{U}_j$ for each customer j, invoke the blocking probability computer to obtain the blocking probabilities for all customers.

(f) If the blocking probability for customer j is less than or equal to Y % of the blocking probability requirement plus the referenced blocking probability for all customers j from 1 to r, decrease $\lambda$ by 1 and continue with step d). If not, proceed with step g).

(g) Identify customer j where the computed blocking probability based on $\lambda$ is greater than Y % of the blocking probability requirement plus the referenced blocking probability for the customer, but it is less for $\lambda+1$. Let S be the set of all such customers. (Clearly, $S \subseteq C$.)

(h) Select one $j \in S$, and set $U_j^*=m_j+\gamma\sqrt{v_j}$ and $U_j^*=m_j+(\gamma+1)\sqrt{v_j}$. In addition, for each $k \in S$ with $k \neq j$, set $U_k=m_k+(\lambda+3)\sqrt{v_k}$.

(i) Perform a bisection search for $\tilde{U}_j$ between $U_j^*$ and $U_j^*$ such that, for any UL parameter of customer j being less than $\tilde{U}_j$, the blocking probability for customer j is greater than Y % of the blocking probability requirement plus the referenced blocking probability for the customer. At each step of the bisection search, the blocking probability computer is invoked to determine the blocking probability for customer-j requests with all other UL parameters, $\tilde{U}_k$'s for $k \neq j$, the GM parameters $L_j^*$'s and the offered load unchanged.

(j) Repeat steps h) and i) for each of all other $j \in S$.

(k) Set $C=C-S$. If C is non-empty, decrease $\gamma$ by 1 and continue with step d). Otherwise, the upper bounds $\{\tilde{U}_j: j=1,2,\ldots,r\}$ for the corresponding UL parameters are thus obtained.

As pointed out earlier, this procedure of steps a) to k) is repeated for the overload traffic and conditional blocking probability requirements. To reduce computation, this can be done by assuming all customers have X % overload. Then, the final upper bound $\tilde{U}_j$ for the UL parameter for each customer j is obtained by taking the maximum of the respective bounds for the nominal and overload conditions, and the lower bound $U_j^*$ pre-specified by the customers.

(3) A Lower Bound for the GM Parameter of Each Customer

The basic idea for identifying a lower bound for the GM parameter for each customer is similar to that presented above for the upper bounds for the UL parameters. Since the upper bounds for the UL parameters $\tilde{U}_j$'s have been determined, they can be used in determining the lower bounds for the GM parameters here. For sake of completeness, the steps for the GM bounds for the nominal traffic load are given as follows:

(a) Based on the resource capacity $K_u$, the nominal offered load, the resource requirement $b_j$, the lower bound for the GM parameter $L_j^*$, the upper bound for the UL parameter $\tilde{U}_j$ for all customers j, invoke the blocking probability computer to determine the blocking probabilities for all customers. These blocking probabilities are referred to as the referenced blocking probabilities in the following.

(b) Assume that the GM and UL parameters for each customer j are $L_j^*$ and $\tilde{U}_j$, respectively. By (70), compute the average $m_j$ and the variance $v_j$ of the number of requests in service from each customer j.

(c) Define a set C to be $\{1,2,\ldots,r\}$. Set $\beta$ to a lower-bound value (e.g., −6). This lower-bound value can be verified by using the blocking probability computer to make sure that the blocking probability for customer j is less than or equal to Y % (e.g., 10%) of the blocking probability requirement plus the referenced blocking probability for all customers j from 1 to r.

(d) For each $j \in C$, set $\tilde{L}_j = \max\{0, m_j+\beta\sqrt{v_j}\}$.

(e) Using the resource capacity $K_u$, and the GM and UL parameters $\tilde{L}_j$ and $\tilde{U}_j$ for each customer j, invoke the blocking probability computer to obtain the blocking probabilities for all customers.

(f) If the blocking probability for customer j is less than or equal to Y % of the blocking probability requirement plus the referenced blocking probability for all customers j from 1 to r, increase β by 1 and continue with step d). Otherwise, proceed with step g) below.

(g) Identify customer j where the computed blocking probability for β is greater than Y % of the blocking probability requirement plus the referenced blocking probability for the customer, but it is less for β−1. Let S be the set of all such customers. (Clearly, $S \subseteq C$.)

(h) Select one j∈S, and set $L_j^* = \max\{0, m_j + (\beta-1)\sqrt{v_j}\}$ and $L_j^* = \max\{0, m_j + \beta\sqrt{v_j}\}$. In addition, for each k∈S with k≠j, set $\tilde{L}_k = \max\{0, m_k + (\beta-1)\sqrt{v_k}\}$.

(i) Perform a bisection search for $\tilde{L}_j$ between $L_j^*$ and $L_j^*$ such that, for any GM parameter for customer j being greater than $\tilde{L}_j$, the blocking probability for customer j is greater than Y % of the blocking probability requirement plus the referenced blocking probability for the customer. At each step of the bisection search, the blocking probability computer is invoked to determine the blocking probability for customer-j requests with all other GM parameters, $\tilde{L}_k$'s for k≠j, all UL parameters $\tilde{U}_j$'s and the offered load unchanged.

(j) Repeat steps h) and i) for each of all other j∈S.

(k) Set C=C−S. If C is non-empty, increase β by 1 and continue with step d). Otherwise, the lower bounds $\{\tilde{L}_j: j=1,2, \ldots, r\}$ for all GM parameters are thus obtained.

Similar to the upper bounds for the UL parameters, this procedure of steps a) to k) is repeated for the overload traffic and conditional blocking probability requirements. For simple computation, this can be done by assuming all customers have X % overload. Then, the final lower bound $\tilde{L}_j$ for the GM parameter for each customer j is obtained by taking the maximum of the respective bounds for the nominal and overload conditions, and the lower bound $L_j^*$ pre-specified by the customers.

(4) Search for the Best Local Optimal Solution

The solution obtained so far with the resource capacity $K_u$, the UL bounds $\{\tilde{U}_j\}$ and the GM bounds $\{\tilde{L}_j\}$ is a "pessimistic" solution. It is feasible, because all nominal and conditional blocking probability requirements are satisfied, but it remains to see if it can be improved. The purpose of this local search procedure is to use the feasible solution as a starting point to look for a local optimum.

At a high level, the main idea of the search procedure is to attempt to reduce the resource capacity from the upper bound $K_u$ by checking to see if there exists a feasible UL and GM parameter setting, which satisfies the nominal and conditional blocking probability requirements. If there exists such a parameter setting, a better solution is found and the procedure repeats itself to further reduce the resource capacity. Otherwise, the procedure stops, as it cannot further reduce the capacity, and the "best" feasible solution has been obtained.

Let K, $U_j$ and $L_j$ be the resource capacity, and the UL and GM parameters for each customer j of the candidate solution under consideration by the local search algorithm. The search procedure is given as follows:

(a) Record the best solution obtained so far: $K = K_u$, $U_j = \tilde{U}_j$ and $L_j = \tilde{L}_j$ for each j=1 to r.

(b) Empty a list of 2r-tuples and then put the 2r-tuple of UL and GM parameters $(U_1, \ldots, U_r, L_1, \ldots, L_r)$ as the first entry onto the list. Set K=K−1.

(c) Consider a candidate solution: the resource capacity K, and the UL and GM parameters $U_j$ and $L_j$ for each customer j.

(d) For the new candidate capacity and traffic parameters, invoke the blocking probability computer to obtain the nominal and conditional blocking probabilities (denoted by $B_j$ and $\overline{B}_j$ respectively) for each customer j at the nominal and overload traffic conditions.

(e) If all blocking probability requirements are met, i.e., if $B_j \leq B_j^*$ and $\overline{B}_j \leq \overline{B}_j^*$ for all j=1 to r, then the tested capacity K is feasible. In this case, record the tested solution as the new best solution and continue with step b). Otherwise, continue with step f).

(f) Set $\eta_j$ to be the maximum of $B_j/B_j^*$ and $\overline{B}_j/\overline{B}_j^*$ for each customer j. Set $\eta_*$ and $\eta^*$ to be the minimum and maximum of all $\eta_j$ for j=1 to r, respectively. If $\eta^* \geq 1/\eta_*$, continue with step g). Otherwise, proceed with step h).

(g) The fact that $\eta^* \geq 1/\eta_*$ implies that a customer has an exceptionally high blocking probability (either nominal or conditional). Let j be the customer index that yields the maximum $\eta_j$ among all customers. If $U_j < \tilde{U}_j$, increase $U_j$ by 1. If $U_j = \tilde{U}_j$, increase $L_j$ by 1. Continue with step i).

(h) The fact that $\eta^* < 1/\eta_*$ implies that a customer has an exceptionally small blocking probability (either nominal or conditional). Let j be the customer index that yields the minimum $\eta_j$ among all customers. If $L_j > L_j^*$, decrease $L_j$ by 1. If $L_j = L_j^*$, decrease $U_j$ by 1.

(i) Check if the 2r-tuple of the UL and GM parameters $(U_1, \ldots, U_r, L_1, \ldots, L_r)$ is already included on the list. If not, add the tuple to the list as a new entry and continue with step c). Otherwise, the procedure cannot further reduce the capacity and the local optimal solution has been found, as previously recorded by step (a) or (e).

C. Response to Resource Failures

Figure 11:
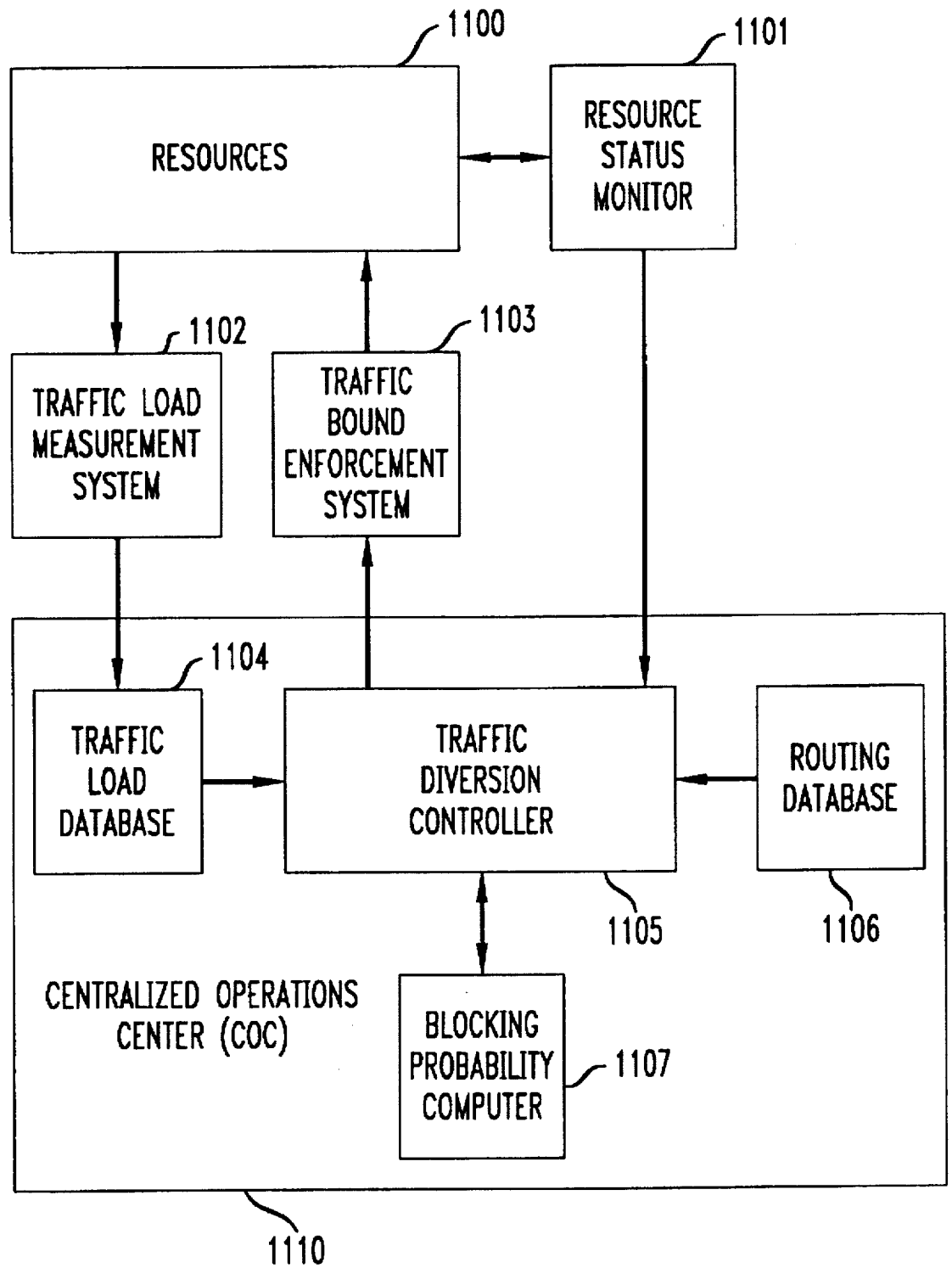
FIG. 11 is a block diagram of a system arranged in accordance with the present invention for performing traffic diversion in response to a resource failure in a resource-sharing system.

A block diagram of a system arranged in accordance with the present invention for performing traffic diversion in response to a resource failure in a resource sharing system is shown in FIG. 11. There are two main components: (1) a set of resources 1100 and (2) a Centralized Operations Center (COC) designated as 1110. A resource status monitor 1101 detects whenever one or more of the resources fails. In a telecommunications system with links as resources, the link status is typically monitored in the switches within the network. A link failure can be detected therein by, for example, a loss of signal.

When a resource failure is detected, resource status monitor 1101 sends a signal to a traffic diversion controller 1105 within COC 1110, which controls the process of diverting demand from the failed resource to alternative resources. Since resource failure is regarded as a temporary situation, it may be deemed desirable to base the traffic diversion on recent customer load on the resources, rather than (or in addition to) negotiated parameters. Hence, it is necessary to know the recent load on the system. For this purpose, a traffic load measurement system 1102 records customer usage over time. Such a system would normally be available anyway, e.g., for the purpose of billing and resource management (including capacity adjustment as described above in Section B).

Periodically, traffic load measurement system 1102 sends traffic load data to a traffic load database 1104 within COC 1110. Thus, at the time of resource failure, traffic diversion controller 1105 has access to the recent traffic loads from traffic load database 1104. When a failure occurs, traffic diversion controller 1105 determines possible sets of alternative resources (e.g., alternative routes) that could be used to meet the demand that was being met by the failed resource. For this purpose, traffic diversion controller 1105 obtains necessary data about availability of alternative resources from a routing database 1106. Then, traffic diversion controller 1105 invokes blocking probability computer 1107 to determine how much load can be diverted to each set of alternative set of resources. Blocking probability computer 1107 is needed to determine if the blocking probabilities of all customers, original and diverted, after the diversion will be satisfactory. Finding the appropriate amount to divert requires extra analysis, which is described below. Traffic diversion controller 1105 also determines appropriate upper limit (UL) and guaranteed minimum (GM) bounds to protect both the original traffic and the diverted traffic on these alternative resources. When traffic controller 1105 determines an appropriate diversion process, this diversion process is communicated to diversion traffic bound enforcement system 1103 for enforcement. For example, in a telecommunication network, diversion bound enforcement could be performed by the switches in the network. Traffic bound enforcement system 1103 thus ensures that the controls are implemented.

In accordance with yet another aspect of the present invention, blocking probability computer 1107 is used to divert customer requests from a failed resource, so that at least part of the demands can be met by the remaining resources. In a resource-sharing system, each customer request occupies certain units of different resources for a period of time. When a resource fails, customer requests demanding the failed resource will be blocked. However, it is assumed that the remaining resources can accommodate some of the needs of these customers.

Such use of alternative resources to meet customer demand is common. In the example of a circuited-switch telecommunication network in FIG. 1, when a link (i.e., resource) fails for some reason such as a fiber cut, calls can be routed through other links, bypassing the failed link. In many cases, the total number of resource units needed to satisfy a specific customer request in case of resource failure is higher than in normal conditions; e.g., because the alternative route often has more links. Nevertheless, the use of alternative resources provides great flexibility in efficiently sharing the resources among customers when failures occur.

The problem addressed by this aspect of the invention is: Given a resource failure, how can the system effectively divert to the remaining resources future customer requests that originally demand the failed resource, without adversely affecting the quality of service provided to other customers? (It is assumed that those customer requests receiving service from the failed resource at the time of the failure are lost, but some of these requests may re-appear as part of future demands.)

An obvious solution to the problem is to divert the customer requests from the failed resource to other applicable resources that have sufficient spare capacities. However, the way to do this is not clear. First, the available spare capacities are actually not known in advance, because the traffic and the performance requirements are characterized probabilistically. In addition, a resource failure may occur together with an increase of the arrival rates of customer requests for the resource. For example, events such as earthquakes, flooding, and hurricanes damaging a telephone link can also cause a large number of calls to be made to the disaster area, thus putting more demand for the failed link. Such a potentially large increase of customer requests for the failed resource, which are now diverted to the remaining resources, can seriously degrade the quality of service for the original customers. Moreover, there is no guaranteed minimum grade of service for the diverted customers.

The central idea of this aspect of the invention is to divert an appropriate proportion of the expected traffic load of customer requests from the failed resource to alternative resources. Using a fairness criterion, an attempt is made to divert the same proportion of traffic for all diverted customers. However, alternative schemes could be considered, which might give different priorities to different customers. The methods here would also apply to these other schemes with appropriate modification.

In addition to diverting an appropriate proportion of the load, the procedure adjusts the UL and GM parameters to try to guarantee the same grade of service for the diverted traffic of each customer. Finally, two new sets of UL bounds are established to ensure the overall protection of the original and diverted traffic against overload of each other.

The diversion process starts by considering one set of alternative resources that can serve the diverted traffic. The procedure determines how much can be diverted to this first set of resources. If there is still more traffic to be diverted, then the procedure considers another set of alternative resources that can serve the diverted traffic. The diversion process continues until all applicable alternative resources have been considered or the traffic load of the affected customers has all been diverted to alternative resources. As with other aspects of this invention, the key component of this diversion procedure is the blocking probability computer. It is used to determine the amount of traffic to divert to alternative resources, and the associated UL and GM traffic parameters.

To illustrate the steps of this diversion procedure in response to failures, a generic resource-sharing system and a telecommunication network are considered separately in the following description. The main purpose of the generic system is to explain the general concepts of the traffic diversion in a relatively simple setting, so that the main ideas are easy to grasp. The purpose of the telecommunication network example is to demonstrate the feasibility for one important class of applications.

Consider a generic resource-sharing system with two resources, one containing squares and the other containing circles, indexed by 1 and 2. Let there be four customers. In normal situations, customer 1 and 2 requests each need one square, and customer 3 and 4 requests each need one circle. Suppose that appropriate UL and GM bounds have been assigned to each customer. Let these be denoted by $U_j$ and $L_j$ for customer j. Unlike in the rest of the detailed description, throughout this Section C, the UL and GM bounds are specified in terms of resource units instead of requests. Thus, $U_j$ is $b_j$ times what it is in other sections.

It is assumed that when the square resource fails, the circle resource can serve as an alternative, but each request from customer 1 and 2 requires two circles. In case of such failure, it is desirable to identify and enforce appropriate UL and GM traffic bounds for the circles such that requests of customer 1 and 2, the diverted traffic, can be accommodated as much as possible, while protecting the satisfactory grade of service for customer 3 and 4 requests, the original traffic. One can view the diversion of customer 1 and 2 requests to the circle resource as the assignment of two new customers to the circle resource in response to the failure of the square resource.

In this generic resource-sharing system, the traffic diversion procedure constantly monitors the offered load of requests of each customer. Let the estimated offered load of customer j requests immediately prior to the failure of the square resource be $\rho_j$. (This estimated offered load may reflect both the original load contracted by the customer and the actual observed load over recent history prior to the failure.) When the square resource fails, the respective resource requirements for customer 1 to 4 requests for the circle resource are $b_{21}=2$, $b_{22}=2$, $b_{23}=1$ and $b_{24}=1$. Then, the procedure attempts to divert a fraction, $0<\alpha<1$, of offered load of customer 1 and 2 requests to the circle resource.

Since the new candidate offered load is different from the original offered load for the diverted traffic, it is natural to adjust the UL and GM bounds. A simple approach would be to make these bounds proportional to the old bounds, in proportion to the new offered load $\alpha\rho_j$ compared to the contracted offered load. However, to better meet the blocking requirements, the normal approximation can be used. The normal approximation accounts for the way the capacity should change when the offered load changes, so that the blocking probabilities remain fixed (approximately). Hence, the new UL and GM bounds for this diverted traffic (denoted by $U_j$ and $L_j$ for j=1 and 2) for the circle resource can be determined by the normal approximation. That is, for j=1 and 2, let the number of circles required by the diverted customer-j requests be approximated by a normally distributed random variable, $N(m_j,\sigma_j^2)$, with mean $m_j$ equal $\alpha\rho_j b_{2,j}$ and variance $\sigma_j^2$ being $\alpha\rho_j z_j b_{2,j}^2$ where $z_j$ is the arrival peakedness of customer-j requests. Let c and d be two real-valued parameters, properly chosen according to the blocking probability requirements and other engineering considerations. (Typical values of c and d lie between 2 and 4, and −4 and −2, respectively.) If $\rho_j$ is the original contracted offered load on which the UL and GM bounds $U_j$ and $L_j$ were originally assigned, then c and d can be chosen so that $U_j=m_j+c\sigma_j$ and $L_j=m_j+d\sigma_j$ for $\alpha=1$. Then, for customer j=1 and 2, the new UL parameter $U_j'$ is chosen to be the minimum of the positive integers closest to $m_j+c\sigma_j$ and $(K_2-L_3-L_4)$, where $K_2$ is the total number of circles available. Furthermore, the new GM parameter $L_j'$ is set to be the minimum of the integers closest to $m_j+d\sigma_j$ and $(K_2-L_3-L_4)$.

Combining the original and diverted traffic, the new candidate offered load for the circle resource is given by a vector, $\rho=(\alpha\rho_1,\alpha\rho_2,\rho_3,\rho_4)$ and the associated UL and GM bounds have been obtained above. Now the procedure invokes the blocking probability computer to determine the blocking probability for requests of each customer in sharing the circle resource. These probabilities are compared to the blocking probability requirements. Depending on whether or not all the requirements are satisfied, the procedure can be repeated to attempt to divert more or less customer 1 and 2 requests to the circle resource by a simple binary search on $\alpha$. (The candidate UL and GM bounds are adjusted for each new $\alpha$.) Eventually, the procedure stops after diverting an appropriate fraction of customer 1 and 2 requests to the circle resource with the associated UL and GM parameters specified. It may be desirable to further adjust and refine the UL and GM bounds for the diverted traffic, using the blocking probability computer.

In addition to the individual UL bound for the diverted traffic from each customer, the procedure offers further overload protection by obtaining two new UL bounds (denoted by $U_o$ and $U_d$) for the original traffic (customer 3 and 4 requests) and the diverted traffic (customer 1 and 2 requests). Since different customers with possibly very different resource requirements are combined for these new UL bounds, it is important that these bounds be expressed in terms of resource units rather than requests. These new UL bounds $U_o$ and $U_d$ can be found by normal approximations as follows. Let the number of circles occupied by the original traffic be approximated by a normally distributed random variable, $N(m_o,\sigma_o^2)$, with mean $m_o$ equal $\Sigma_{j=3}^{4}\rho_j b_j$ and variance $\rho_o^2$ being $(\Sigma_{j=3}^{4}\rho_j z_j b_j^2)$. Then, $U_o$ is chosen to be the minimum of the positive integers closest to $m_o+c\sigma_o$ and $(K_2-L_3-L_4)$ where c is an appropriate parameter, typically in the range of 2 to 4, and not necessarily equal to the parameter c above. Similarly, $U_d$ for the diverted customer 1 and 2 requests can be obtained. The new parameter c might again be different from previous ones. For example, it may be deemed desirable to give greater protection to the original traffic than to the diverted traffic. These UL bounds $U_o$ and $U_d$ can be checked and refined by using the blocking probability computer.

Until the square resource is put back in service, the system diverts each new customer 1 and 2 request to the circle resource for service, while the UL and GM traffic bounds for each customer, as well as the new UL bounds for the overall original and diverted traffic are continuously enforced (as described above). This way, not only customer 1 and 2 requests are served in case of failure of the needed square resource, the grades of service for all customers are also guaranteed and protected by the UL and GM bounds.

The basic principle of protecting both the diverted and original traffic in face of resource failures can work in many systems in essentially the same way as in the generic example above. However, the identification of alternative resources for the failed resources may be more involved than in this generic example. Furthermore, the enforcement of the newly established UL and GM bounds is also likely to be more complicated. To show the applicability of the proposed approach to a specific system, a telecommunication network is considered. This network can be a current circuit-switched network or a future B-ISDN network based on the ATM technology. A high-level flowchart for traffic diversion in response to link failures in the network is outlined in FIG. 12 and the diversion procedure is discussed in detail below.

Figure 1:
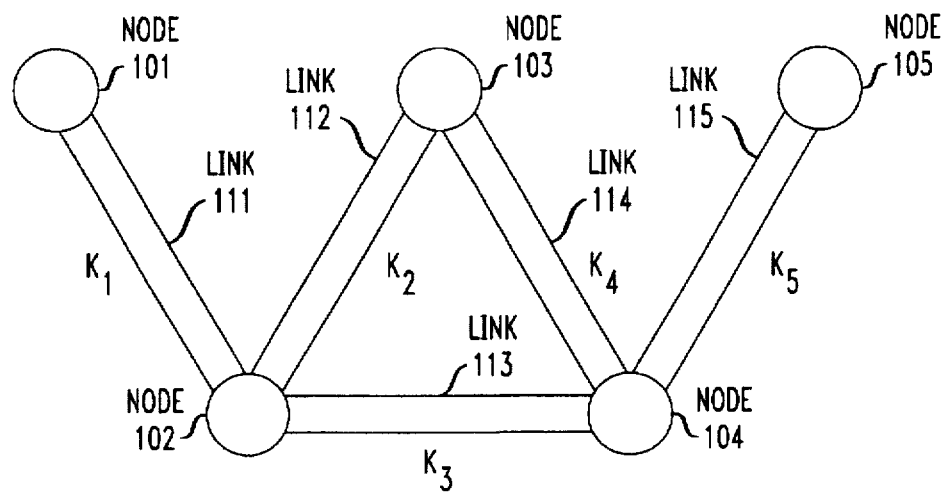
FIG. 1. is a representation of a conventional circuit-switched telecommunication network with which the present invention can operate.

Consider a telecommunication network such as shown in FIG. 1, with a number of communication links, which are the resources in question. To ensure a high degree of reliability, there often are multiple routes (i.e., a path consisting of multiple links) from one switch (node) to another in the network. Thus, each call can possibly be routed through one of several routes and the choice is made by a "routing algorithm" at the time of the call setup. Some routing algorithms commonly used in telecommunication networks, such as the Real-Time Network Routing algorithm described by Ash et at. in U.S. Pat. No. 5,101,451, issued Mar. 31, 1992, are called "dynamic" algorithms, because they make use of the current network state to select the most appropriate route for each call. The specific routing algorithm is not critical here; it could be static or dynamic.

To illustrate the applicability of this invention, routing algorithms are classified as non-adaptive and adaptive in their response to failures as follows. In non-adaptive routing, when one link of a route from one switch to another fails, the entire route must be replaced. Calls for the origin-destination switch pair are routed via other pre-established alternative routes. In contrast, an adaptive routing algorithm automatically looks for a new route between the two end switches (referred to as the failure-end switches) of the failed link. As a result, calls can be routed according to the original route until reaching a failure-end switch. Then, the calls are directed to the new alternative route, bypassing the failed link to the other failure-end switch. Finally, the call routing proceeds from there along the remaining part of the original route, until reaching their destination. It is possible that there are multiple new routes connecting the failure-end switches. In this case, each call in question can take one of these routes according to the routing algorithm in use, if applicable. Alternatively, a round-robin scheme, a sequential overflow scheme (where the new routes are arranged in a priority order, such that low priority routes are attempted for routing the call when high priority routes are busy), or other state-dependent dynamic scheme can be used for this purpose.

If the network under consideration employs a nonadaptive routing algorithm, it will be efficient for the source switch to divert its calls from the failed route to other alternative routes and to enforce the UL and GM traffic bounds for performance guarantee and protection. In this case, the traffic diversion should be carried out on the basis of origin-destination switch pairs. On the other hand, for adaptive routing algorithms, it may be more efficient for the failure-end switches to divert traffic from the failed link to alternative routes connecting the switches and to enforce the associated UL and GM bounds for the diverted calls. Then, traffic is diverted simply on a per-call-class basis, without considering the source and destination of calls. The following discussion focuses on the traffic diversion and enforcement only for the adaptive routing algorithms. The same principle also applies to the non-adaptive routing algorithms, but with added complexity in traffic monitoring, diversion, and enforcement on an origin-destination basis.

Assume that the telecommunication network has a centralized operations center (COC) for traffic monitoring, diversion and other maintenance functions, block 1110 in FIG. 11. Also assume that critical information for traffic diversion is available at the COC. This information includes: a) the expected call load for each origin-destination switch pair in the network, b) the preferred routes for calls for each switch pair, and c) the grade of service in terms of blocking probabilities, the contracted (offered) load, and the UL and GM bounds for each call class on each link. With the contracted load in the network, these UL and GM parameters are specified and enforced to guarantee a minimum grade of service and to protect against overload of each class of calls.

Assuming that a link i carries r classes of calls, let the contracted load for the link be denoted by $\hat{\rho}_o = (\rho_o^1, \rho_o^2, \ldots, \rho_o^r)$. In addition, let the UL and GM bounds in terms of the number of circuits for the contracted traffic for link i be $\underline{U}_o = (U_o^1, U_o^2, \ldots, U_o^r)$ and $\underline{L}_o = (L_o^1, L_o^2, \ldots, L_o^r)$, respectively. Based on $\hat{\rho}_o$, $\underline{U}_o$ and $\underline{L}_o$ for each link i, the COC pre-computes the binding parameters $c_j$ and $d_j$ for each call class j as $$c_j = \frac{U_o^j - \hat{\rho}_o b_{ij}}{\sqrt{\hat{\rho}_o z_j b_{ij}^2}} \text{ and } d_j = \frac{L_o^j - \hat{\rho}_o b_{ij}}{\sqrt{\hat{\rho}_o z_j b_{ij}^2}},$$

where $z_j$ is the arrival peakedness of class j calls and $b_{ij}$ is the number of circuits occupied by a class j call on link i.

The traffic diversion process starts with step 1201 of the flowchart of FIG. 12, in which each switch in the network constantly monitors the mount of traffic load of different call classes (i.e., the carried load) on each link emerging from the switch and the fraction of calls blocked (i.e., the blocking probabilities). Each switch reports the carried load and blocking probabilities for each of its links to the COC periodically and the COC saves the data for future referencing.

When a switch detects a link failure in step 1202 by loss of signal from the link, it reports the failure to the COC. Let switch A and B be the failure-end switches for the failed link. After receiving the notification of the failure, the COC retrieves in step 1203, the most current data of the carried load and blocking probabilities for the failed link. It is assumed that the COC can develop a good estimate of the offered load for each traffic class, based on the original contracted offered load and recent history of carried load. The estimated load could simply be the original contracted load (for which no data are needed) or the most recent estimate of carried load, but it could be a more complicated combinations of these and other historical data. For simplicity, here it is assumed that only the mostresent carried load estimate is used.

Let there be r classes of calls sent from switch A to B via the failed link and let the call classes be indexed by 1,2, ... r. Furthermore, let the carried load and the blocking probability for each call class j for the failed link be denoted by $\phi_j$ and $P_j$, respectively, for j=1,2, ..., r. Following the data retrieval, the COG estimates the mount of offered load of class i calls on the failed link from switch A to B, $\rho_f^j$, by dividing $\phi_j$ by 1-$P_j$ also in step 1203. Note that this offered load is expected to be different from the contracted load for the link because of traffic fluctuation. The COC may thus elect to adjust $\rho_f^j$, e.g., replace $\rho_f^j$ by the minimum or some other function of the observed (carried) load and the contracted load for that class. Let $\rho_f = (\rho_f^1, \rho_f^2, \ldots, \rho_f^r)$ be the amount of traffic to be diverted.

Next, in step 1204, a determination is made as to whether $\rho_f$ the amount of traffic remaining to be diverted, has reached zero. If YES, the diversion procedure has successfully been completed, and the process stops in step 1207. Otherwise, the COC proceeds to step 1205, in order to identify the next shortest alternative route from switch A to switch B, which has not been used already in this traffic diversion. It may be deemed desirable to identify the shortest alternative route in terms of the number of intermediate switches the route has to go through. Then one can apply a technique such as that invented by Mansour and Nguyen in the U.S. Pat. No. 5,058,105, to find the shortest alternative route. If it is determined in step 1206 that no new alternative route exists, then all alternative routes from switch A to B, bypassing the failed link, have been considered and loaded with a portion of the diverted traffic. In this case, the process of FIG. 12 stops in step 1207, although it cannot fully divert all traffic from the failed link without degrading the grade of service for the original traffic in the network.

If a new alternative route exists, so that a YES result occurs in step 1206, the COC invokes the blocking probability computer in step 1208 to determine the amount of traffic load of classes 1 to r, denoted by $\rho_d = (\rho_d^1, \rho_d^2, \ldots, \rho_d^r)$, that the alternative route can accept from the failed link. In particular, this method uses a proportional approach to divert traffic of all classes; that is, the same proportion of calls from all classes is diverted from the failed link to an alternative route. Furthermore, as an approximation step in the analysis, it is assumed here that the original traffic for all classes on all links of the contemplated route are mutually independent. Thus, in the model, only the diverted calls require the simultaneous possession of all links of the alternative route. (Another approach is to consider the whole network with all call classes, instead of focusing on the alternative route. However, in order to analyze a large network, the blocking probability computer is likely to apply reduced-load approximations, which also ignore some degree of the resource dependence.)

The proportion of traffic to be diverted to an alternative route is determined by the following steps:

(a) Let the chosen alternative route consist of J links, indexed by 1,2, ..., J. The COC estimates the offered lead for each call class on each of these links by dividing the carried lead by one minus the blocking probability for the call class on the link. (The carried lead and blocking proability on each link are updated and recorded at the COC periodically.) As with diverted traffic, this may be the minimum or some other function of the contracted and measured offered lead for the link. For simplicity, each link is assumed to have the same number r of call classes. Let the offered lead for one of the J links be denoted by $\varrho_o=(\rho_o^1,\rho_o^2,\ldots,\rho_o^r)$.

(b) For the chosen alternative route, construct a resource-sharing model with J resources and (J+1) r classes of calls (customers), where each resource represents one of the J links in the alternative route, and the $j^{th}$ and $(J+1)^{st}$ set of r classes of requests correspond to the original and diverted traffic on the $j^{th}$ link of the route, respectively. As stated above, it is assumed that the original traffic classes on all links are mutually independent and only the diverted calls require the simultaneous possession of all J links. Let $\alpha_U$ and $\alpha_L$ denote the respective upper and lower bounds for the proportion of traffic to be diverted from the failed link. Initially, set $\alpha_L=0$ and $\alpha_U=1$.

(c) Set $\alpha=(\alpha_U-\alpha_L)/2$ and the amount of diverted traffic to the alternative route, $\varrho_d$, to be $\alpha\varrho_f=(\alpha\rho_f^1, \alpha\rho_f^2, \ldots, \alpha\rho_f^r)$.

(d) If the difference between $\alpha_U$ and $\alpha_L$ is less than a pre-specified tolerance, $\alpha$ is the fraction of traffic to be diverted to the alternative route. That is, $\varrho_d$ is finalized to be $(\alpha\rho_f^1, \alpha\rho_f^2, \ldots, \alpha\rho_f^r)$. In addition, the per-call-class UL and GM parameters $U_d^j$ and $L_d^j$ for call class j=1 to r, and the new UL bounds $U_{o,i}$ and $U_{d,i}$ for the original and diverted traffic on each link i have been found. The procedure stops. Otherwise, proceed with step e) below.

(e) For each link i of the alternative route, set $\gamma_i$ to be the ratio of expected circuit occupancy of the diverted traffic to that of the contracted traffic on link i. That is, set $$\gamma_i = \frac{\sum_{j=1}^{r} \rho_d^j b_{ij}}{\sum_{j=1}^{r} \rho_o^j b_{ij}}.$$

Let the UL and GM bounds for the diverted traffic on link i be $\underline{U}_d=(U_d^1, U_d^2, \ldots, U_d^r)$ and $\underline{L}_d=(L_d^1, L_d^2, \ldots, L_d^r)$. Let $c_j$ and $d_j$ be the pre-determined per-call-class binding parameters for the UL and GM bounds for link i described above. For each call class j, set $U_d^j$ to be the minimum of the positive integers closest to $(\gamma_i\rho_o^j b_{ij}+c_j\sqrt{\lambda_i\rho_o^j z_j b_{ij}})$ and $K_i$, where $K_i$ is the total number of circuits in link i. In addition, set $L_d^j$ to be the minimum of the positive integers closest to $(\gamma_i\rho_o^j+d_j\sqrt{\lambda_i\rho_o^j z_j b_{ij}})$ and $$\left\lfloor \frac{\left(K_i - \sum_{k=1}^{r} L_o^k\right) L_o^j}{\sum_{k=1}^{r} L_o^k} \right\rfloor.$$

(f) For each call class j, choose the minimum among all $U_d^j$'s for all links i of the alternative route. Without introducing additional notation, let $U_d^j$ denote such minimum. Similarly, for each class j, obtain the minimum $L_d^j$ among the $L_d^j$'s for all links i. (The UL and GM traffic bounds $U_d^j$ and $L_d^j$ can be enforced for class j calls on every link of the alternative route.)

(g) In order to provide further protection against overload, obtain two sets of new UL bounds (denoted by $U_{o,i}$ and $U_{d,i}$ for every link i) for the original traffic and the diverted traffic by normal approximations as follows. For each link i of the alternative route, let the number of circuits occupied by the original (contracted) traffic on link i be approximated by a normally distributed random variable, $N(m_o,\sigma_o^2)$, with mean $m_o$ equal $\sum_{j=1}^{r}\rho_o^j b_{ij}$ and variance $\sigma_o^2$ being $\sum_{j=1}^{r}\rho_o^j z_j b_{ij}^2$. With properly chosen binding parameters c and d, $U_{o,i}$ is chosen to be the minimum of the integers closest to $m_o+c\sigma_o$ and $K_i-\sum_{i=j}^{r}(L_o^j+L_d^j)$. Similarly, $U_{d,i}$ is set to be the minimum of the integers closest to $m_o+d\sigma_o$ and $K_i-\sum_{i=j}^{r}(L_o^j+L_d^j)$. Similarly, $U_{d,i}$ is set to be minimum of the integers closets to $m_o+d\sigma_o$ and $K_i-\sum_{j=1}^{r}(L_o^j+L_d^j)$. The bounds $U_{o,i}$ and $U_{d,i}$ can be checked and tuned by using the blocking probability computer.

(h) With the combined offered load, $\varrho_o$ and $\varrho_d$, and the per-call-class UL and GM parameters, and the overall UL bounds for the original and diverted traffic, invoke the blocking probability computer to obtain the blocking probability for each call class, original and diverted, in the resource-sharing model. Compare the blocking probability for each call class with the pre-specified blocking requirement (which is known to the COC). In this comparison, the same blocking requirements can be applied to both the original and diverted calls, provided that they are of the same class. If there is any call class with blocking probability exceeding the requirement, set $\alpha_U=\alpha$. (As an option, $\alpha_U$ is set to $\alpha$ only after the procedure has attempted to adjust the UL and GM bounds for the diverted traffic with other parameters unchanged, and found the blocking probability for at least one call class violating the requirement. This option may improve the diversion efficiency for some parameter settings because the UL and GM bounds estimated by the normal approximation may not be appropriate for the amount of diverted traffic under consideration.) Otherwise, set $\alpha_L=\alpha$. Then, continue the binary search on $\alpha$ with step c).

After identifying the amount of traffic to be diverted to the chosen alternative route in step 1208 and the UL and GM parameters, the COC notifies the failure-end switch A and other switches along the alternative route with the associated traffic bounds. Then, the COC computes the remaining traffic to be diverted from the failed link in step 1209, and the process returns to step 1204 to divert the remaining traffic, if any. This procedure continues until all traffic is successfully diverted from the failed link or all alternative routes have been examined and loaded with certain amount of the diverted traffic.

The per-call-class UL and GM bounds and the new UL bounds for the original calls can be enforced by the switches on the alternative route. More precisely, the bounds associated with a link can be observed by the switch that sends traffic onto the link. In contrast, the per-call-class UL and GM bounds and the new UL bound for the diverted calls can be enforced only by the failure-end switch A. Thus, switch A only need to know the corresponding minimum of the UL and GM bounds for various call classes or links for proper traffic enforcement for the diverted calls.

One way to enable efficient traffic enforcement is to keep the link failure known to only the failure-end switches and the COC. As a result, other switches in the network can continue to route traffic as if the link failure did not occur. When a call needs to be routed from switch A to B (where switch A can be the originating or via switch of the call), switch A can identify if the call is a diverted call (i.e., one requires the failed link). If so, switch A makes sure that the UL and GM traffic bounds are satisfied according to the steps for traffic enforcement, as described above, before accepting and diverting the call to one of the established alternative routes, according to the call routing algorithm used in the network, if applicable. Alternatively, a round-robin scheme, a sequential overflow scheme, or a state-dependent dynamic scheme, can be used to make the selection. Note that the routing scheme can affect the peakedness of the call arrivals to the alternative routes. Thus, for a given the routing scheme, it may be desirable to adjust the peakedness parameters for various alternative routes for input to the blocking probability computer for accurate determination of the blocking probabilities.

If the call routing algorithm of the network requires the use of the loading status of the failed link, and if it is not available for the diverted traffic directly, then such information can be assembled by the failure-end switches, by keeping track of the loading status of diverted traffic among the established alternative routes.

With this traffic diversion method, one can view that a failed link is partially or even fully "replaced" by the established alternative routes, because the GM parameters guarantee a minimum grade of service for the diverted traffic on the alternative routes, and the new UL parameters protect the original and diverted traffic along the alternative route from possible overload of each other.

In fact, this traffic diversion procedure can handle multiple link failures and switch failures. Note that a switch failure can be regarded as a case of multiple (simultaneous) link failures for all links emerging from the switch. For the case of multiple link failures that do not occur simultaneously, the diversion procedure can work well, because traffic can be diverted from one failed link at a time on a first-come-first-served basis. If a particular link is involved in several alternative routes for different failed links, the link can be loaded with traffic diverted from multiple failed links. As a result, the link carries an additional set of call classes diverted from each failed link. In this situation, the diverted traffic from various failed links will have their respective UL and GM traffic bounds, which can be enforced separately by the corresponding switches, in the same way as described above.

To divert traffic in response to a switch failure, the procedure requires each switch to monitor not only the traffic load to its neighboring switches (i.e., traffic load on each of the links emerging from the switch) as suggested above, but also the amount of traffic routed to the neighbors of the neighboring switches. The traffic load is periodically reported to the COC. As a result, when a switch fails, the amount of traffic between each pair of its neighboring switches is known to the COC. Then, the same diversion procedure can be applied to divert this amount of traffic from one of the neighboring switches to another, bypassing the failed switch. Now, the failure-end switches are the neighboring switches. In addition, the alternative routes to receive the diverted traffic are those from one switch to another that used to be the neighbors of the failed switch. The procedure determines the amount of diverted traffic and the associated UL and GM bounds for each of the alternative routes. As before, the UL and GM traffic bounds can be enforced by the switches along the alternative routes.

Furthermore, a minor variation of the same procedure also applies to a telecommunication network without a COC. In this case, each switch monitors and keeps the traffic load data locally. When a link failure occurs, a distributed algorithm, such as the distributed asynchronous Bellman-Ford algorithm (see Bertsekas and Gallager, *Data Networks*, Prentice-Hall, 1992, pp.404–410), can be used to identify the shortest alternative routes. Once the alternative route is found, the failure-end switch A is responsible for collecting the traffic data needed for the diversion from the switches on the alternative route. With the traffic data, switch A performs the traffic diversion in the same way as the COC does. As a result, the amount of diverted traffic and the associated UL and GM bounds can be determined for the alternative route. Then, switch A notifies the switches on the route with the bounds for traffic enforcement. If switch A finds that them is traffic remaining to be diverted from the failed link, it initiates further traffic diversion on the next alternative route. The traffic enforcement by the UL and GM bounds for the original traffic can continue to be done by the switches that send traffic onto the links. In addition, the traffic bounds for the diverted traffic can be enforced by the failure-end switch A.

Various modifications and adaptations of the present invention will be apparent to persons skilled in the art. Accordingly, it is intended that this invention be limited only by the following claims.

What is claimed is:

1. A method of controlling admission of a new customer to a shared resource serving existing customers, each of said customers having a predetermined traffic load, said method comprising the steps of determining nominal and conditional blocking probability requirements for each of said existing customers and for said new customer; said nominal blocking probability requirements being based upon compliance by all of said customers with said predetermined traffic load and said conditional blocking probability requirements being based upon deviation by one or more of said customers from said predetermined traffic load, determining if both said nominal and conditional blocking probability requirements of said new customer can be satisfied without violating both said nominal and conditional blocking probability requirements of said existing customers, and if both said nominal and conditional blocking probability requirements of said new customer can be satisfied, allowing said new customer to be admitted to said shared resource.

2. A method of controlling admission of new customers to a shared resource, in which said new customers can be provided with multiple grades of service, including protection against overloads from existing customers and other new customers, said method comprising the steps of retrieving stored information defining the requirements of said existing customers, and obtaining the requirements and grade of service desired by each of said new customers;

responsive to said retrieved information, determining if said requirements of said new customer can be satisfied without violating the requirements of said existing customers, said determination being made in accordance with a product-form resource sharing model which has a normalization constant; and allowing said new customer to be admitted to said shared resource with said described grade of service only if said requirements of said new customer can be satisfied, wherein said determining step includes calculating blocking probabilities for usage of said shared resource by said new customers and said existing customers by numerically inverting a generating function of said normalization constant of said resource sharing mode.

3. A method of controlling admission of a new customer to a shared resource serving existing customers, in which said existing customers and said new customer can be provided with multiple grades of service, each of said grades of service being defined by a traffic requirement and a blocking requirement, said method comprising the steps of obtaining information indicating (a) the grade of service of said existing customers and (b) the grade of service desired by said new customer;

responsive to said grade of service desired by said new customer, assigning upper-limit UL and guaranteed-minimum GM bounds of the usage of said shared resource to said new customer, said upper-limit bound putting an upper limit on the usage of said shared resource by the customer and said guaranteed-minimum bound representing a guaranteed minimum usage of the shared resource, determining if said grade of service of said new customer can be provided without violating the requirements of said existing customers, and if said grade of service of said new customer can be provided, allowing said new customer to be admitted to said shared resource with said desired grade of service, wherein said determining step includes computing a blocking probability for said new customer by numerically inverting a generating function of a normalization constant of a resource sharing model, and determining if said blocking probability is less than the blocking requirement and satisfies the UL and GM bounds assigned to said new customer.

4. A method for real time admission control to determine in real time whether a prospective new customer can be admitted to a resource with a desired grade of service, comprising the steps of determining the desired grade of service for the prospective customer, determining if the desired grade of service can be met considering both the prospective customer and all existing customers, wherein said determining includes computing blocking probabilities for said prospective customer and said existing customers by numerically inverting a generating function of a normalization constant of a resource sharing model, if the desired grade of service can be provided, admitting the new customer with the desired grade of service, and if the desired grade of service cannot be met, then determining if a lower grade of service is feasible.

5. A method of adjusting the capacity of a shared resource so as to satisfy new levels of customer demand, comprising the steps of creating a resource sharing model for the shared resource that has a product-form steady-state distribution and a normalization constant, responsive to a change of customer demand, determining the new demand level for said shared resource, and adjusting the capacity of the shared resource to satisfy blocking requirements for all customers, wherein said adjusting step includes calculating blocking probabilities for usage of shared resource by said customers by numerically inverting a generating function of said normalization constant of said resource sharing model.

6. A method of diverting customer usage from failed resources to alternative resources in a shared resource system, comprising the steps of monitoring the system to determine failure of a resource, identifying appropriate alternative resources, and adjusting usage to meet blocking probability requirements of existing and diverted customers on said alternative resources, wherein said adjusting step is made in accordance with a product-form resource sharing model which has a normalization constant, and wherein the blocking probabilities for usage of said shared resource by said diverted customers and said existing customers are calculated by numerically inverting a generating function of said normalization constant of said resource sharing model.

7. A technique for providing different grades of service and protection against overloads to customers sharing a resource, comprising the steps of assigning each customer upper-limit (UL) and guaranteed-minimum (GM) bounds on requests, said upper limit bound putting an upper limit on the number of requests from that customer that can be in service at any time, and said guaranteed-minimum bound guaranteeing that there will always be available resource units in the resources to serve a specified number of requests from that customer, and creating a resource-sharing model having a product-form steady-state distribution, and solving the resource-sharing model using a blocking probability computer (BPC) which operates by (a) directly expressing said model in terms of normalization constants appearing in the product-form steady-state distribution, (b) computing the normalization constants by constructing a generating function of the normalizing constant and (c) numerically inverting the generating function.

8. The method of claim 7 wherein said numerically inverting step includes using a Fourier-series method with a scaling algorithm tailored to the resource-sharing model.

9. The invention defined in claim 7 or 8 wherein said BPC is arranged to (a) approximately determine the traffic load on each resource using a normal approximation scheme, (b) determining if there are some resources that are so lightly loaded that they provide essentially no constraint, (c) responsive to said last mentioned step, eliminating lightly loaded resources from said model before constructing said generating function.

10. The invention defined in claim 7 or 8 further including reducing the effective dimension of the generating function by conditional decomposition and inverting the variables of the multidimensional generating function in an order.

11. The method of claim 10 further including determining, after said normal approximation and conditional decomposition steps, if the model is not yet solvable, and if so, performing a reduced-load fixed-point approximation process to approximately solve the model.

12. A method of controlling admission of new customers to a shared resource that is serving existing customers, said method comprising the steps of determining the blocking probability requirements of said existing customers;

determining the blocking probability requirements and grade of service desired by each of said new customers;

determining if said requirements of the new customers can be satisfied without violating said requirements of said existing customers, said determination being made in accordance with a product-form resource sharing model which has a normalization constant, and said determination includes calculating the blocking probabilities for usage of said shared resource by said new customers and said existing customers by numerically inverting a generating function of said normalization constant of said resource sharing model; and if said new customers requirements can be satisfied, allowing said new customer to be admitted to said shared resource.

* * * * *